(12) United States Patent
Montojo et al.

(10) Patent No.: US 8,837,380 B2
(45) Date of Patent: Sep. 16, 2014

(54) METHOD AND APPARATUS FOR CELL SEARCH IN AN ORTHOGONAL WIRELESS COMMUNICATION SYSTEM

(75) Inventors: Juan Montojo, San Diego, CA (US); Byoung-Hoon Kim, Seoul (KR); Durga Prasad Malladi, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 775 days.

(21) Appl. No.: 12/443,960

(22) PCT Filed: Oct. 31, 2007

(86) PCT No.: PCT/US2007/083265
§ 371 (c)(1),
(2), (4) Date: Oct. 6, 2009

(87) PCT Pub. No.: WO2008/057898
PCT Pub. Date: May 15, 2008

(65) Prior Publication Data
US 2010/0103906 A1    Apr. 29, 2010

Related U.S. Application Data

(60) Provisional application No. 60/863,965, filed on Nov. 1, 2006.

(51) Int. Cl.
| | |
|---|---|
| *H04B 7/185* | (2006.01) |
| *H04B 7/216* | (2006.01) |
| *H04B 7/212* | (2006.01) |
| *H04W 4/00* | (2009.01) |
| *H04J 1/00* | (2006.01) |
| *H04B 7/208* | (2006.01) |
| *H04J 3/06* | (2006.01) |
| *H04J 11/00* | (2006.01) |
| *H04W 48/08* | (2009.01) |
| *H04L 5/00* | (2006.01) |

(52) U.S. Cl.
CPC ............ *H04J 11/0069* (2013.01); *H04W 48/08* (2013.01); *H04L 5/0023* (2013.01); *H04B 2201/70701* (2013.01); *H04L 5/0048* (2013.01); *H04L 5/0037* (2013.01)
USPC ........... 370/329; 370/318; 370/320; 370/324; 370/328; 370/335; 370/342; 370/343; 370/350

(58) Field of Classification Search
None
See application file for complete search history.

(56) References Cited

U.S. PATENT DOCUMENTS

| | | |
|---|---|---|
| 7,496,113 B2 | 2/2009 | Cai et al. |
| 2004/0023918 A1 | 2/2004 | Monia et al. |

(Continued)

FOREIGN PATENT DOCUMENTS

| | | |
|---|---|---|
| EP | 1533950 A1 | 5/2005 |
| EP | 1619847 A2 | 1/2006 |

(Continued)

OTHER PUBLICATIONS

Ericsson AB: "Downlink Reference Signals Discussion" [Online] No. R1-063008, pp. 1-4 (Oct. 10, 2006) XP002480597.

(Continued)

*Primary Examiner* — Faruk Hamza
*Assistant Examiner* — Diane Lo
(74) *Attorney, Agent, or Firm* — Peng Zhu

(57) ABSTRACT

Systems and methodologies are described that provide techniques for efficient cell search in a wireless communication system. In one aspect, a frequency reuse pattern can be generated by applying frequency shifts to reference signals transmitted from cells that provide coverage for a NodeB based on cell IDs or cell group IDs for the cells. The frequency shifts applied to reference signals can then be utilized as a basis for multiplexing reference signals from different cells using frequency division multiplexing (FDM) or a combination of FDM and other multiplexing techniques. Other adjustments to reference signals transmitted from respective cells, such as transmit power adjustments, can further be made to improve detection performance.

42 Claims, 13 Drawing Sheets

(56) References Cited

U.S. PATENT DOCUMENTS

| | | | |
|---|---|---|---|
| 2004/0023919 | A1 | 2/2004 | Ohsawa et al. |
| 2005/0128993 | A1* | 6/2005 | Yu et al. .................. 370/342 |
| 2005/0195910 | A1* | 9/2005 | Kim et al. ................. 375/260 |
| 2005/0243940 | A1* | 11/2005 | Huh et al. ................. 375/260 |
| 2005/0286402 | A1 | 12/2005 | Byun et al. |
| 2006/0039451 | A1* | 2/2006 | Zhuang et al. ............. 375/145 |
| 2006/0062196 | A1* | 3/2006 | Cai et al. ................... 370/345 |
| 2006/0114812 | A1* | 6/2006 | Kim et al. .................. 370/206 |
| 2007/0041348 | A1* | 2/2007 | Kwun et al. ............... 370/335 |
| 2007/0076668 | A1 | 4/2007 | Tirkkonen et al. |
| 2007/0183391 | A1 | 8/2007 | Akita et al. |
| 2007/0248113 | A1* | 10/2007 | Ko et al. .................... 370/436 |
| 2008/0045260 | A1* | 2/2008 | Muharemovic et al. ...... 455/522 |
| 2009/0219802 | A1 | 9/2009 | Han et al. |
| 2009/0225704 | A1* | 9/2009 | Lee et al. ................... 370/329 |
| 2010/0035611 | A1 | 2/2010 | Montojo et al. |

FOREIGN PATENT DOCUMENTS

| | | |
|---|---|---|
| JP | 06504660 | 5/1994 |
| JP | 2007336499 A | 12/2007 |
| KR | 20050059179 A | 6/2005 |
| RU | 2157548 | 10/2000 |
| RU | 2252429 | 5/2005 |
| TW | I244277 | 11/2005 |
| TW | I244847 | 12/2005 |
| WO | WO9210890 | 6/1992 |
| WO | WO98048294 | 10/1998 |
| WO | WO0001127 A1 | 1/2000 |
| WO | WO2006104482 A1 | 10/2006 |
| WO | WO2007135733 A1 | 11/2007 |

OTHER PUBLICATIONS

Huawei: "Cell-Specific Integer Sequences for Frequency Positioning of DL RS on Subframe Basis" [Online] No. R1-070532, Sorrento, Italy, (Jan. 15, 2007)-(Jan. 19, 2007), XP002480600.

Huawei: "Frequency-Shifting or Frequency-Hopping of DL Reference Symbols: Implications to Cell Search and Through Put Performance" [Online] No. R1-063032, Riga, Latvia, (Nov. 6, 2006)-(Nov. 10, 2006), XP002480599.

Huawei: "Large Sets of FH Pilot Patterns" [Online] No. R1060224, XP002480596, Helsinki, Finland (Jan. 23, 2006)-(Jan. 25, 2006).

LG Elecronics: "LGE's Views on the Various Aspects of Downlink Reference Signal Design" [Online] No. R1-062561, pp. 1-6 Seoul Korea, (Oct. 9, 2006)-(Oct. 13, 2006), XP002480598.

NTT DOCOMO: "Physical Channel Concept for Scalable Bandwith in Evolved Utra Downlink" 3GPP TSG RAN WG1 AD HOC on LTE, [Online] No. R1-05092, pp. 1-14. Sophia Antipolis, France, (Jun. 20, 2005)-(Jun. 21, 2005), XP002482057.

ZTE, Ritt: "Reference Signal Sequence Design for Etura Downlink" 3GPP TSG-RAN WG1 ADHOC Meeting on LTE, [Online] No. R1-061760, pp. 1-7, Cannes, France, (Jun. 27, 2006)-(Jun. 30, 2006), XP002482058.

International Search Report—PCT/US2007083265, International Search Authority—European Patent Office, Feb. 6, 2008.

Written Opinion—PCT/US2007/083265, International Search Authority—European Patent Office, Feb. 6, 2008.

Taiwan Search Report—TW096141219—TIPO—Dec. 13, 2011.

\* cited by examiner

METHOD AND APPARATUS FOR CELL SEARCH IN AN ORTHOGONAL WIRELESS COMMUNICATION SYSTEM

CROSS-REFERENCE

This application claims the benefit of U.S. Provisional Application Ser. No. 60/863,965, filed Nov. 1, 2006, entitled "A METHOD AND APPARATUS FOR CELL SEARCH IN AN ORTHOGONAL WIRELESS COMMUNICATION SYSTEM," the entirety of which is incorporated herein by reference.

BACKGROUND

I. Field

The present disclosure relates generally to wireless communications, and more specifically to techniques for performing cell search in a wireless communication system.

II. Background

Wireless communication systems are widely deployed to provide various communication services; for instance, voice, video, packet data, broadcast, and messaging services may be provided via such wireless communication systems. These systems may be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

When a terminal enters the coverage area of a wireless communication system, is powered on, or otherwise initially becomes active in a system, the terminal is often required to engage in an initial cell search procedure to become operational in the system. During a cell search procedure, a terminal typically performs time and frequency synchronization with the system. Further, a terminal typically identifies a cell in which the terminal is located and other critical system information, such as bandwidth and transmitter antenna configurations.

Cell search is often conducted in wireless communication systems through the use of synchronization and/or reference signals. However, various features of systems such as third generation long term evolution (3G LTE) systems and evolution universal terrestrial radio access (E-UTRA) systems, such as the presence of a cyclic prefix to mitigate inter-symbol interference in orthogonal frequency division multiplexing and downlink system bandwidth versatility, can complicate the construction of synchronization and/or reference signals in a manner that is efficient and reliable. Accordingly, there exists a need for cell acquisition procedures that maximize overall system speed and reliability while minimizing required resources.

SUMMARY

The following presents a simplified summary of the disclosed embodiments in order to provide a basic understanding of such embodiments. This summary is not an extensive overview of all contemplated embodiments, and is intended to neither identify key or critical elements nor delineate the scope of such embodiments. Its sole purpose is to present some concepts of the disclosed embodiments in a simplified form as a prelude to the more detailed description that is presented later.

According to an aspect, a method for coordinating transmission of signals for cell acquisition in a wireless communication system is described herein. The method can comprise creating a frequency reuse pattern at least in part by identifying a base set of frequencies at which a reference signal can be transmitted and applying one or more frequency shifts to the base set of frequencies to obtain shifted sets of frequencies; linking respective cells to respective sets of frequencies in the frequency reuse pattern selected from the group consisting of the base set of the frequencies and the shifted sets of frequencies based on identifiers of the respective cells; generating reference signals for transmission by the respective cells on sets of frequencies respectively linked to the cells; and transmitting the reference signals at the respective cells using the sets of frequencies respectively linked to the cells.

Another aspect relates to a wireless communications apparatus that can comprise a memory that stores data relating to one or more sectors and a frequency reuse pattern corresponding to a set of frequency shifts. The wireless communications apparatus can further include a processor configured to assign respective frequency shifts to respective sectors based on identifiers for the respective sectors and to multiplex reference signals transmitted at the respective sectors in frequency by instructing transmission of the reference signals at the respective sectors on respective sets of frequencies based on the assigned frequency shifts.

Yet another aspect relates to an apparatus that facilitates cell acquisition in a wireless communication system. The apparatus can comprise means for identifying a frequency reuse pattern comprising respective sets of frequencies corresponding to respective frequency shifts; means for assigning respective frequency shifts to respective sectors based at least in part on the frequency reuse pattern and identifiers for the respective sectors; and means for coordinating transmission of reference signals at the respective sectors on sets of frequencies corresponding to the respective frequency shifts assigned to the sectors.

Still another aspect relates to a computer-readable medium that can comprise code for causing a computer to generate a frequency reuse pattern at least in part by generating a base frequency set and one or more shifted frequency sets corresponding to respective frequency shift parameters; code for causing a computer to associate respective cells to respective frequency shift parameters based at least in part on identifiers for the respective cells; and code for managing construction and transmission of reference signals at the respective cells on frequency sets corresponding to the respective frequency shift parameters associated with the respective cells.

According to another aspect, an integrated circuit is described herein that executes computer-executable instructions for managing transmission of signals for cell acquisition in a wireless communication system. The instructions can comprise assigning respective frequency sets for transmission of a reference signal to respective sectors based on a frequency reuse pattern and identifiers of the respective sectors, frequency shifts are applied to the respective frequency sets based on the identifiers of the respective sectors; and coordinating multiplexed transmission of reference signals at the respective sectors in frequency by instructing transmission of reference signals at the sectors on the frequency sets respectively assigned to the sectors.

According to a further aspect, a method for performing cell acquisition in a wireless communication system is described herein. The method can comprise receiving one or more synchronization codes containing information regarding frequency resources used by respective sectors for transmission of reference signals; receiving a reference signal from a sector; identifying a set of frequency resources on which the reference signal was received; and identifying the sector from which the reference signal was received based at least in part on the information contained in the synchronization codes and the set of frequency resources on which the reference signal was received.

Another aspect relates to a wireless communications apparatus that can comprise a memory that stores data relating to frequency shifts applied to reference signals transmitted from respective cells served by a NodeB based on identities of the respective cells. The wireless communications apparatus can further comprise a processor configured to receive a reference signal, determine a frequency shift applied to the reference signal, and identify a cell that transmitted the reference signal based at least in part on the frequency shift applied to the reference signal.

Yet another aspect relates to an apparatus that facilitates identification of a cell from which a reference signal is received. The apparatus can comprise means for receiving frequency reuse information relating to frequency sets utilized for transmission of reference signals by respective cells based on identifiers of the respective cells; means for receiving a reference signal; means for identifying a frequency set on which the reference signal was received; and means for identifying a cell from which the reference signal was received based at least in part on the frequency reuse information and the frequency set on which the reference signal was received.

Still another aspect relates to a computer-readable medium, which can comprise code for causing a computer to obtain data relating to frequency shifts applied to transmissions of reference signals based on identifiers of respective sectors from which the reference signals are transmitted; code for causing a computer to receive a reference signal from a sector; and code for causing a computer to identify a sector from which the reference signal was received at least in part by identifying a frequency shift applied to the reference signal.

An additional aspect relates to an integrated circuit that can execute computer-executable instructions for performing cell search in a wireless communication system. The instructions can comprise obtaining information relating to identities of respective cells and frequency shifts applied to reference signals transmitted from the respective cells; receiving a reference signal on a set of frequencies; identifying a frequency shift applied to the reference signal based on the set of frequencies on which the reference signal was received; and identifying a cell that transmitted the reference signal based on the identified frequency shift.

To the accomplishment of the foregoing and related ends, one or more embodiments comprise the features hereinafter fully described and particularly pointed out in the claims. The following description and the annexed drawings set forth in detail certain illustrative aspects of the disclosed embodiments. These aspects are indicative, however, of but a few of the various ways in which the principles of various embodiments may be employed. Further, the disclosed embodiments are intended to include all such aspects and their equivalents.

DETAILED DESCRIPTION

Figure 1:
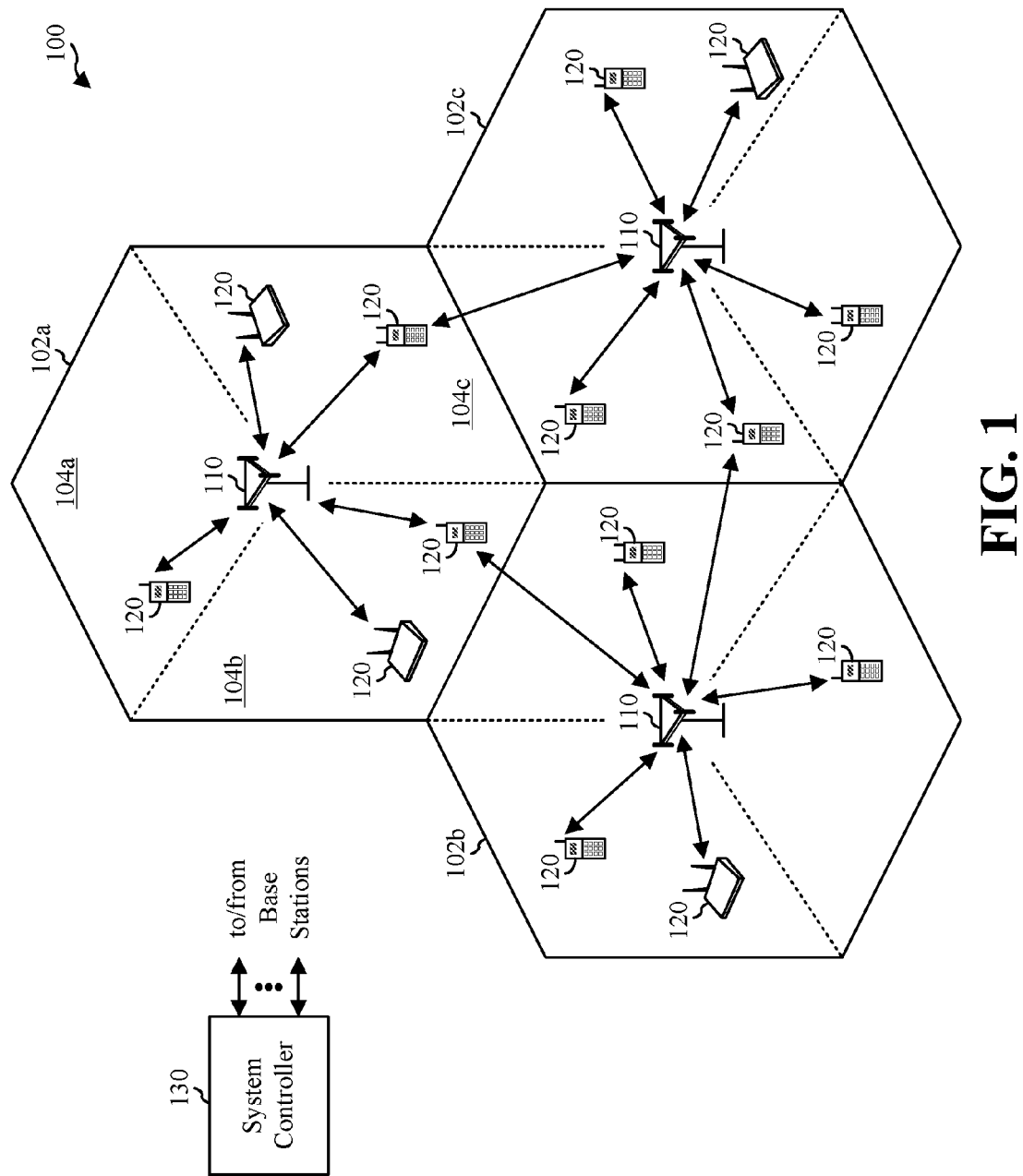
FIG. 1 illustrates a wireless multiple-access communication system in accordance with various aspects set forth herein.

Various aspects are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment. A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 is an illustration of a wireless multiple-access communication system 100 in accordance with various aspects. In one example, the wireless multiple-access communication system 100 includes multiple base stations 110 and multiple terminals 120. Further, one or more base stations 110 can communicate with one or more terminals 120. By way of non-limiting example, a base station 110 may be an access point, a Node B (e.g., an Evolved NodeB or eNB), and/or another appropriate network entity. Each base station 110 provides communication coverage for a particular geographic area 102. As used herein and generally in the art, the term "cell" can refer to a base station 110 and/or its coverage area 102 depending on the context in which the term is used.

To improve system capacity, the coverage area 102 corresponding to a base station 110 may be partitioned into multiple smaller areas (e.g., areas 104a, 104b, and 104c). Each of the smaller areas 104a, 104b, and 104c may be served by a respective base transceiver subsystem (BTS, not shown). As used herein and generally in the art, the term "sector" can refer to a BTS and/or its coverage area depending on the context in which the term is used. Further, as used herein and generally in the art, the term "cell" can also be used to refer to the coverage area of a BTS depending on the context in which the term is used. In one example, sectors 104 in a cell 102 can be formed by groups of antennas (not shown) at base station 110, where each group of antennas is responsible for communication with terminals 120 in a portion of the cell 102. For example, a base station 110 serving cell 102a may have a first antenna group corresponding to sector 104a, a second antenna group corresponding to sector 104b, and a third antenna group corresponding to sector 104c. However, it should be appreciated that the various aspects disclosed herein may be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein may refer both to a station that serves a sector as well as a station that serves a cell.

In accordance with one aspect, terminals 120 may be dispersed throughout the system 100. Each terminal 120 may be stationary or mobile. By way of non-limiting example, a terminal 120 may be an access terminal (AT), a mobile station, user equipment (UE), a subscriber station, and/or another appropriate network entity. A terminal 120 may be a wireless device, a cellular phone, a personal digital assistant (PDA), a wireless modem, a handheld device, or another appropriate device. Further, a terminal 120 may communicate with any number of base stations 110 or no base stations 110 at any given moment.

In another example, the system 100 can utilize a centralized architecture by employing a system controller 130 that can be coupled to one or more base stations 110 and provide coordination and control for the base stations 110. In accordance with alternative aspects, system controller 130 may be a single network entity or a collection of network entities. Additionally, the system 100 may utilize a distributed architecture to allow the base stations 110 to communicate with each other as needed. In one example, system controller 130 can additionally contain one or more connections to multiple networks. These networks may include the Internet, other packet based networks, and/or circuit switched voice networks that may provide information to and/or from terminals 120 in communication with one or more base stations 110 in system 100. In another example, system controller 130 can include or be coupled with a scheduler (not shown) that can schedule transmissions to and/or from terminals 120. Alternatively, the scheduler may reside in each individual cell 102, each sector 104, or a combination thereof.

In one example, system 100 may utilize one or more multiple-access schemes, such as CDMA, TDMA, FDMA, OFDMA, Single-Carrier FDMA (SC-FDMA), and/or other suitable multiple-access schemes. TDMA utilizes time division multiplexing (TDM), wherein transmissions for different terminals 120 are orthogonalized by transmitting in different time intervals. FDMA utilizes frequency division multiplexing (FDM), wherein transmissions for different terminals 120 are orthogonalized by transmitting in different frequency subcarriers. In one example, TDMA and FDMA systems can also use code division multiplexing (CDM), wherein transmissions for multiple terminals can be orthogonalized using different orthogonal codes (e.g., Walsh codes) even though they are sent in the same time interval or frequency sub-carrier. OFDMA utilizes Orthogonal Frequency Division Multiplexing (OFDM), and SC-FDMA utilizes Single-Carrier Frequency Division Multiplexing (SC-FDM). OFDM and SC-FDM can partition the system bandwidth into multiple orthogonal subcarriers (e.g., tones, bins, . . . ), each of which may be modulated with data. Typically, modulation symbols are sent in the frequency domain with OFDM and in the time domain with SC-FDM. Additionally and/or alternatively, the system bandwidth can be divided into one or more frequency carriers, each of which may contain one or more subcarriers. System 100 may also utilize a combination of multiple-access schemes, such as OFDMA and CDMA.

In another example, base stations 110 and terminals 120 in system 100 can communicate data using one or more data channels and signaling using one or more control channels. Data channels utilized by system 100 can be assigned to active terminals 120 such that each data channel is used by only one terminal at any given time. Alternatively, data channels can be assigned to multiple terminals 120, which can be superimposed or orthogonally scheduled on a data channel. To conserve system resources, control channels utilized by system 100 can also be shared among multiple terminals 120 using, for example, code division multiplexing.

Figure 2:
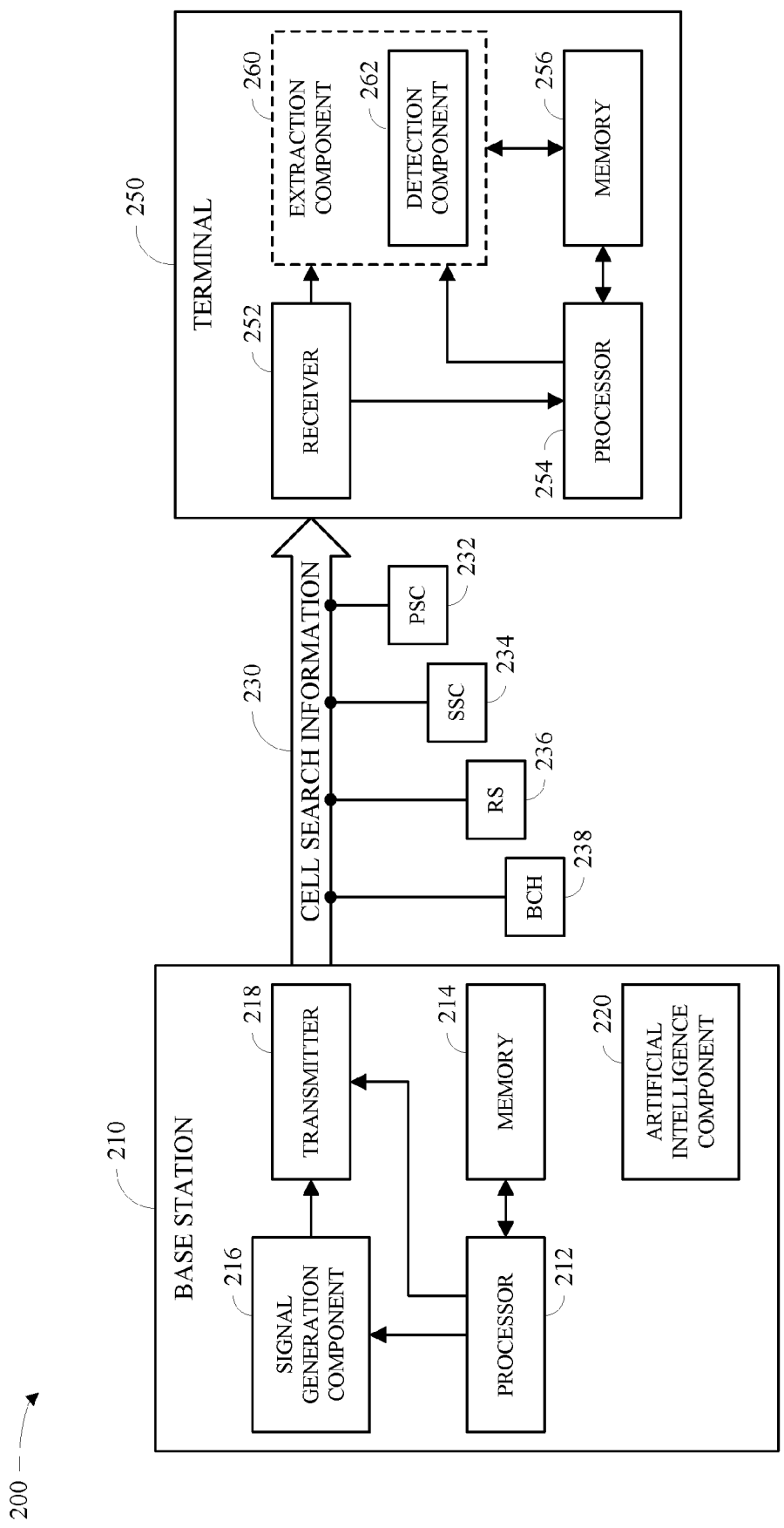
FIG. 2 illustrates an example system that facilitates cell search in a wireless communication system in accordance with various aspects.

FIG. 2 is a block diagram of an example system 200 that provides cell search functionality in a wireless communication system in accordance with various aspects set forth herein. System 200 can include one or more base stations 210 and one or more terminals 250, which can communicate with each other on forward and reverse links using one or more wireless communication protocols.

In accordance with one aspect, when a terminal 250 is powered on, enters an active state from an idle state, moves into the coverage area of a base station 210, or otherwise obtains the ability to communicate in system 200, the terminal 250 can conduct cell acquisition to become operational in system 200. Upon initially entering system 200, a terminal 250 may not be aware of parameters necessary for communication in system 200, such as timing of system 200, frequency resources utilized within system 200, the bandwidth of system 200, which base stations 210 in system 200 are transmitting, and/or other parameters. Thus, to become operational in system 200, terminal 250 can obtain these parameters and/or other necessary information for communication through a cell search or cell acquisition procedure with, for example, a base station 210.

In one example, a terminal 250 can perform timing synchronization with system 200 and/or base station 210 during a cell acquisition procedure to obtain parameters such as symbol boundaries, frame and subframe boundaries, broadcast channel transmission time interval (TTI) boundaries, and/or other timing parameters utilized by system 200. Further, a terminal 250 can perform frequency synchronization with system 200 and/or base station 210 during cell search to acquire, for example, a carrier frequency utilized for downlink transmission so that it can be used as a frequency reference for uplink transmissions. A terminal 250 can additionally acquire other system information necessary for communication in system 200 during cell acquisition, such as the identity of base station 210 and/or a cell within a coverage area of base station 210 that services an area in which terminal 250 is located, system bandwidth, antenna configurations used at base station 210 and/or cells within base station 210, cyclic prefix (CP) durations utilized within system 200, and/or other parameters.

In another example, system parameters can be provided to terminal 250 during cell search by base station 210 via cell search information signaling 230. This signaling can include, for example, a primary synchronization code (PSC) 232, a second synchronization code (SSC) 234, a reference signal (RS) 236, and a broadcast channel (BCH) 238. Various structures in which signaling 230 can be transmitted, as well as various functions that signaling 230 can perform, are described in more detail infra.

Base station 210 can include a processor, which can work alone or in combination with a signal generation component 216 to generate and prepare the cell search information signaling 230 for transmission to terminal 250 via a transmitter 218. Processor 212 can additionally interact with memory 214. In one example, processor 212 and/or signal generation component 216 at base station 210 can construct cell search information signaling 230 based on timing synchronization, frequency synchronization, and/or other system parameters. These parameters can be embedded by base station 210 into individual signals 232-238 and/or combinations of signals.

Base station 210 can also include an artificial intelligence (AI) component 220. The term "intelligence" refers to the ability to reason or draw conclusions about, e.g., infer, the current or future state of a system based on existing information about the system. Artificial intelligence can be employed to identify a specific context or action, or generate a probability distribution of specific states of a system without human intervention. Artificial intelligence relies on applying advanced mathematical algorithms—e.g., decision trees, neural networks, regression analysis, cluster analysis, genetic algorithm, and reinforced learning—to a set of available data (information) on the system. In particular, AI component 220 can employ one of numerous methodologies for learning from data and then drawing inferences from the models so constructed, e.g., hidden Markov models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches (that perform data fusion, etc.) in accordance with implementing various automated aspects described hereinafter.

In accordance with another aspect, cell search information signaling 230 and/or other signals can then be received by terminal 250 via a receiver 252. These signals can then be provided to a processor 254 and/or an extraction component 260 to allow terminal 250 to perform cell acquisition based on the received information. In one example, extraction component 260 can extract system parameters from the cell search information 230, thereby allowing terminal 250 to become operational in system 200. Further, processor 254 and/or extraction component 260 can interact with memory 256. Additionally and/or alternatively, terminal 250 can further include an AI component (not shown) that can operate in a similar manner to AI component 220 at base station 210 to facilitate automation of terminal 250.

Extraction component 260 can further include a detection component 262, which can determine whether signaling received by extraction component 260 contains one or more cell search information signals 232-238. By way of example, detection component 262 can perform coherent detection for a signal, such as RS 236, over a modulation symbol or a predetermined time period by utilizing channel information obtained from another signal, such as PSC 232 and/or SSC 234, to locate RS 236 in frequency. Alternatively, detection component 262 can perform non-coherent detection for a signal over a modulation symbol or time period by directly summing the signal in the frequency domain over the symbol or time period. Based on results obtained from coherent and/or non-coherent detection over given symbols and/or time periods, detection of a given signal can be completed by performing coherent and/or non-coherent combining over a series of symbols and/or time periods.

Figure 3:
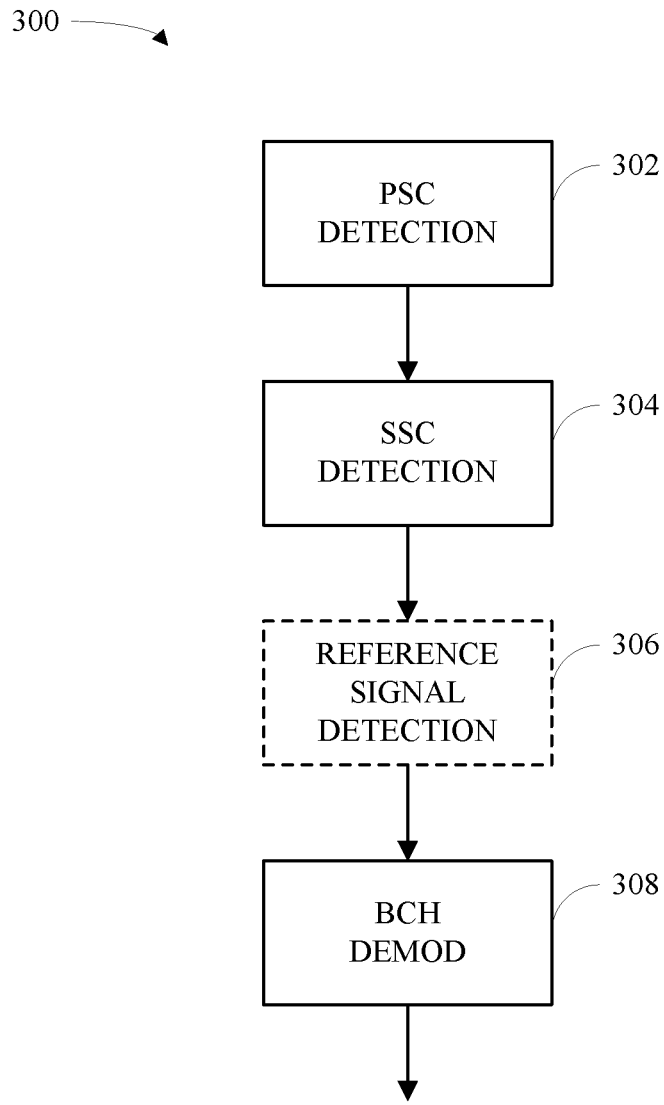
FIG. 3 illustrates an example cell search procedure that can be utilized in a wireless communication system in accordance with various aspects.

FIG. 3 is a diagram that illustrates an example cell search procedure 300 that can be utilized in a wireless communication system (e.g., system 200) in accordance with various aspects. In one example, a terminal (e.g., terminal 250) can conduct cell search procedure 300 to obtain parameters necessary for communication in a wireless communication system. Procedure 300 can start by detecting a primary synchronization code (PSC), as illustrated by block 302. A PSC detected at block 302 can be transmitted on, for example, a primary synchronization channel (P-SCH). Further, a PSC can be common to a wireless communication system or can be individually tailored by entities in the system (e.g., base stations 210) to convey system parameters as discussed in more detail infra. Additionally, a PSC detected as illustrated by block 302 can be utilized to obtain rough timing information for a system, such as OFDM symbol, slot, and subframe time boundaries and/or other suitable timing information.

Once a PSC has been detected as illustrated by block 302, a secondary synchronization code (SSC) can then be detected, as illustrated by block 304. A SSC can be transmitted on, for example, a secondary synchronization channel (S-SCH). In one example, a sequence used for a SSC can be chosen from a group of possible sequences and can be used to convey a cell ID or a cell group ID corresponding to an entity that transmits the SSC. In addition, a SSC can be used to provide additional timing synchronization to supplement information provided in a corresponding PSC. For example, a SSC can be used to convey half radio-frame and radio-frame time boundaries. Further, like a PSC, a SSC can be individually tailored by entities in a system to convey system parameters as discussed in more detail infra.

After a PSC and SSC are detected as illustrated at blocks 302 and 304, a reference signal (RS) can then optionally be detected as illustrated by block 306. A reference signal can be constructed using, for example, pilot tones transmitted in a given pattern in time and frequency. A reference signal can be used to convey a cell ID in the event that a SSC provides only a cell group ID. In addition, a reference signal can be used to provide other system parameters as discussed in further detail infra. Procedure 300 can then continue as illustrated at block 308 by demodulating signals received over a broadcast channel (BCH), such as a primary broadcast channel (P-BCH). Signals received over the broadcast channel can include further information regarding the system and/or an entity transmitting over the broadcast channel.

In accordance with one aspect, a system in which procedure 300 is performed may be capable of multiple bandwidths (e.g., 1.25 MHz, 1.6 MHz, 2.5 MHz, 5 MHz, 10 MHz, 15 MHz, 20 MHz, etc.). Thus, to allow a terminal to perform cell acquisition irrespective of a bandwidth used by the system, signals in procedure 300 can be transmitted over a common frequency band that is agnostic to the system bandwidth. For example, signals used in procedure 300 can be transmitted over a frequency band spanning 1.08 MHz, 1.25 MHz, or any other appropriate bandwidth.

In accordance with another aspect, a PSC and/or SSC detected at blocks 302 and 304 of cell search procedure 300 can be constructed to include system information in order to aid a terminal in detecting a reference signal and/or a broadcast channel at blocks 306 and 308. For example, a PSC and/or SSC can be configured to include information regarding a number of transmit antennas present at a cell from which the codes are transmitted. In one example, a reference signal can comprise a series of pilot tones that are transmitted in a set pattern in time and frequency based on the number of transmit antennas used to transmit the signal. Accordingly, knowledge of the number of transmit antennas used to transmit the reference signal prior to receiving the reference signal can allow a terminal to use the energy of the pilot tones present in the reference signal to aid in its detection. Information regarding number of transmit antennas can be embedded in a PSC and/or SSC by varying the time location of a PSC within a radio frame, varying a sequence used for a PSC and/or SSC, and/or by any other appropriate means.

As another example, a PSC and/or SSC can be configured to convey information regarding a number of sectors served by a given Node B (e.g., a base station 210). Reference signals for sectors within a cell served by a Node B can, for example, be multiplexed using code division multiplexing (CDM) to share time and/or frequency resources. Therefore, knowledge of the number of sectors served by a Node B prior to detection of a reference signal can additionally improve detection performance. In one example, information regarding the number of sectors served by a Node B can be embedded into a PSC and/or SSC in a similar manner to information regarding the number of transmit antennas at a cell.

As an additional example, information regarding system bandwidth can be embedded into a PSC and/or SSC. In one example, a system can be capable of operation under multiple bandwidths; consequently, a terminal performing cell acquisition via procedure 300 may not initially be aware of the bandwidth employed by a system. Because of this, a PSC, SSC, and/or other cell acquisition signals can be transmitted on a common frequency band for cell acquisition. However, if information regarding system bandwidth is provided prior to detection of a reference signal and/or demodulation of signals over a broadcast channel as illustrated by blocks 306 and 308, reference signals and/or the broadcast channel can be made able to use bandwidth beyond the common frequency band for cell acquisition. As a result, more information will be capable of transmission via the reference signal and/or broadcast channel, which can result in faster and more effective cell acquisition. A PSC and/or SSC can be configured to provide a precise bandwidth utilized by the system. Alternatively, a bandwidth can be specified within a range (e.g., whether the system bandwidth is less than, equal to, or greater than a reference bandwidth). Information regarding system bandwidth can be embedded into a PSC and/or SSC in a similar manner to information regarding transmit antennas and/or sectors served by a Node B. Further, techniques for transmitting a reference signal for various system bandwidth and synchronization code configurations are described in more detail infra.

Figure 4:
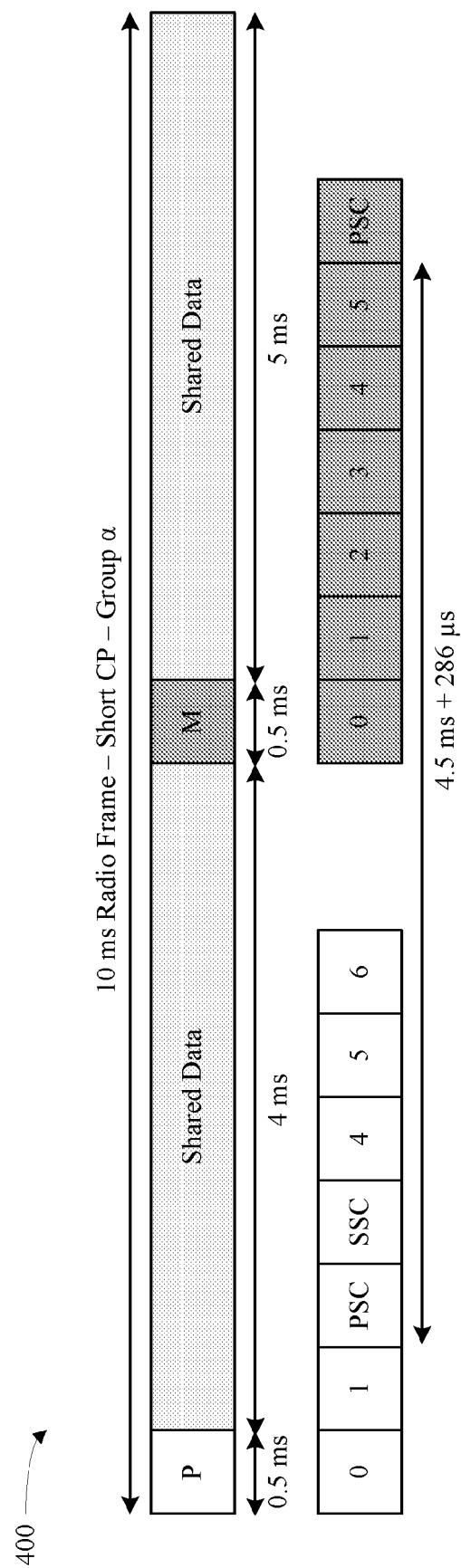
FIG. 4 illustrates an example transmission structure that can be utilized to transmit synchronization codes in a wireless communication system.

FIG. 4 illustrates an example transmission structure 400 that can be utilized to transmit synchronization codes (e.g., PSC 232 and SSC 234) in a wireless communication system (e.g., system 200). Transmission structure 400 illustrates an example structure for a downlink frame that can be utilized in a wireless communication system. As illustrated by structure 400, a frame can be arranged as a series of slots in time, one or more of which can be used for transmission of signaling and/or shared data. In one example, a cyclic prefix utilized by a wireless communication system to mitigate interference resulting from OFDM can be determined by a terminal during cell search based on information provided in one or more subframes in a downlink frame such as the frame illustrated by structure 400.

Structure 400 illustrates one example of locations in time in which a PSC and SSC can be transmitted. In accordance with one aspect, unless corresponding PSC and SSC sequences are located close in time and frequency, a SSC can not be detected coherently using the PSC as a phase reference. As a result, constraints can exist on a type of sequence that can be used for the SSC and, therefore, on the number of different SSC sequences that can be utilized. In general, it should be appreciated that a transmission structure that allows coherent detection of SSC enables a large number of SSC sequences to be utilized, while a transmission structure that allows only non-coherent detection of SSC limits the number of SSC sequences that can be utilized to a small number.

In accordance with another aspect, in a synchronous system, transmission structure 400 can be replicated from cell to cell. Therefore, if PSC and SSC locations within a radio frame are fixed, PSCs that are the same as those utilized by other cells can experience a "single frequency network" (SFN) channel. As a result, a mismatch can be present between the phase of the cell-specific SSC and the cell common-PSC. Because of this, various signal detection techniques can be utilized. For example, a SSC can be non-coherently detected such that corresponding PSC is not used for detection of the SSC. Additionally and/or alternatively, multiple PSCs can be used in the system as opposed to a single common PSC.

Figure 5A:
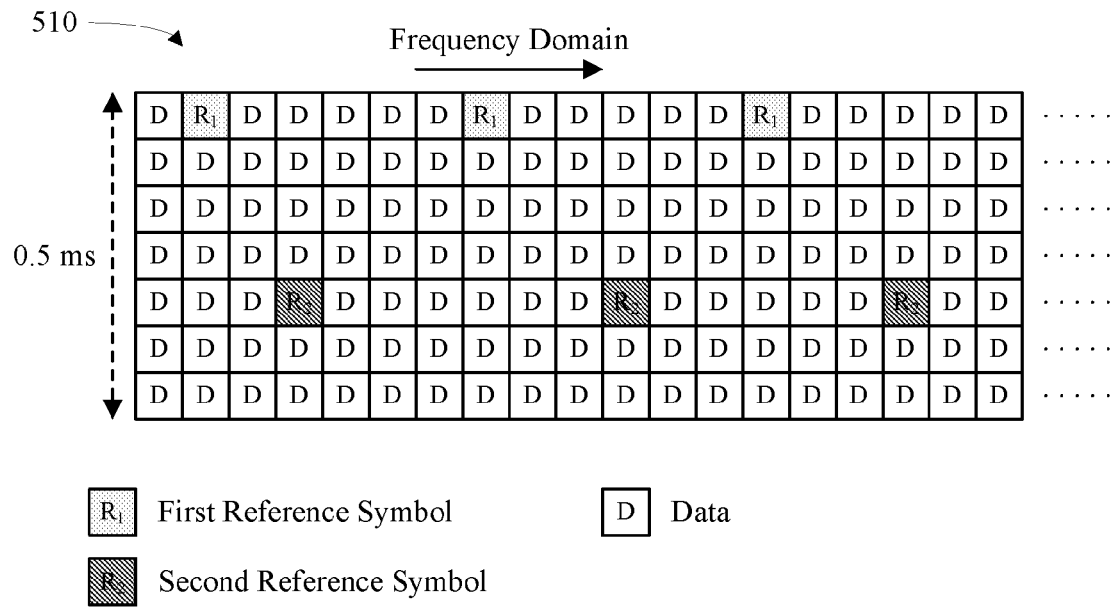
FIGS. 5A-5C illustrate example reference signal structures that can be utilized for cell search in accordance with various aspects.
Figure 5B:
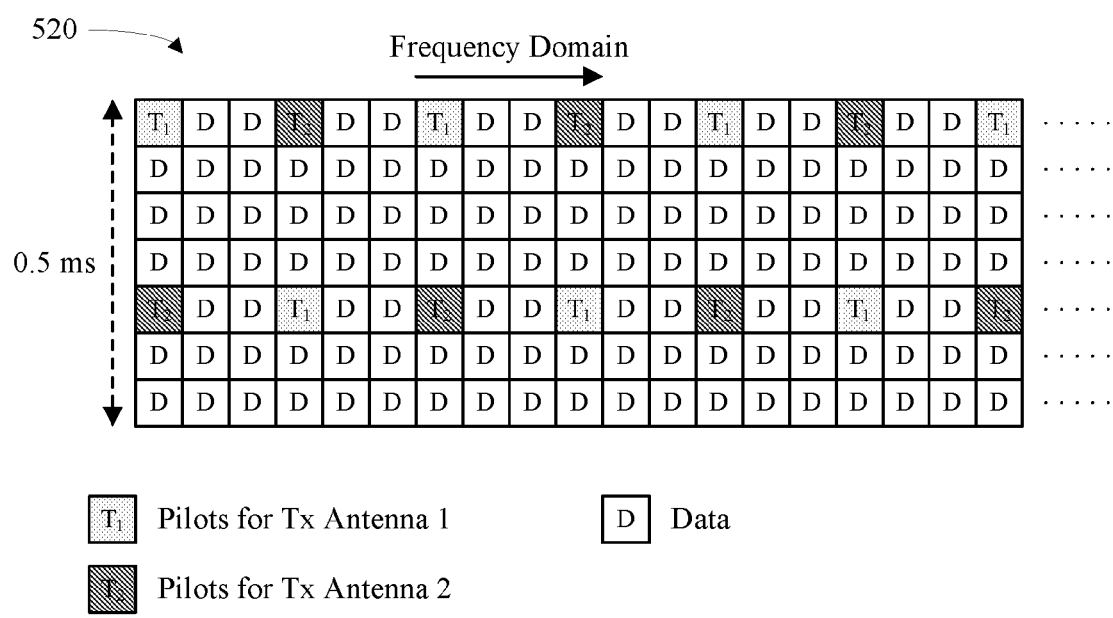
Figure 5C:
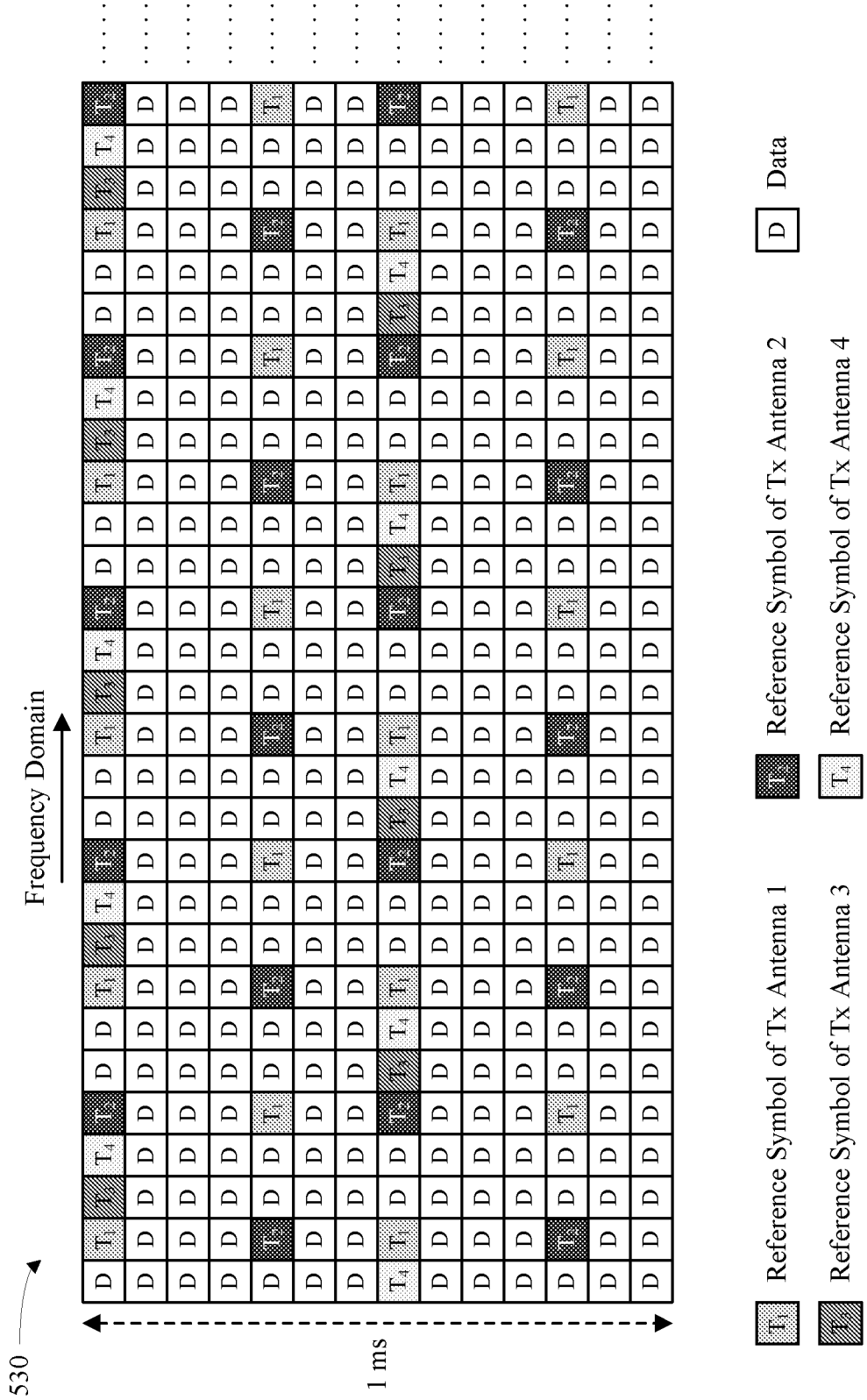

FIGS. 5A-5C are diagrams that illustrate example reference signal structures 510-530 that can be utilized for cell search in accordance with various aspects. In accordance with one aspect, a reference signal can be constructed as a coded sequence. A coded sequence used for construction of a reference signal can be derived from a pseudorandom noise (PN) sequence or other appropriate sequence and may additionally include a cyclic prefix (CP) to mitigate the effects of interference within a system in which the sequence is used. In one example, a CP used in connection with a reference signal can be a short (e.g., normal) CP or a long (e.g., extended) CP. In the case of reference signals utilizing normal CP, orthogonal sequences can be applied to the reference signals to allow multiplexing of reference sequences transmitted from different cells (e.g., sectors 104) in the system. Alternatively, in the case of reference signals utilizing extended CP, cells from which reference sequences are transmitted can be distinguished by utilizing different PN sequence at each cell.

In accordance with one aspect, a sequence utilized for construction of a reference signal can be frequency mapped to a series of pilot tones that can be transmitted at predetermined time intervals. In one example, reference signals can additionally be configured to include system parameters in order to convey those parameters to UEs (e.g., terminals 250) in the system. In accordance with another aspect, a pilot tone sequence utilized for a reference signal can be based on a number of transmit antennas at a cell that transmits the reference signal. For example, diagram 510 in FIG. 5A illustrates an example reference signal structure that can be utilized by a single transmit antenna. As illustrated in diagram 510, the transmit antenna can alternate in time between transmitting a first reference signal at a first set of frequencies and a second reference signal at a second set of frequencies. As another example, diagram 520 in FIG. 5B illustrates an example reference signal structure that can be utilized by a cell having two transmit antennas. As illustrated in diagram 520, each transmit antenna can alternate in time between transmitting pilot symbols at a first set of frequencies and a second set of frequencies in a similar manner to the single transmit antenna illustrated by diagram 510.

Additionally, diagram 530 in FIG. 5C illustrates an example reference signal structure that can be utilized, for example, by a cell having four transmit antennas. As illustrated in diagram 530, two of the four transmit antennas, denoted in diagram 530 as transmit (Tx) Antenna 1 and Tx Antenna 2, can alternate in time between transmitting pilot symbols at a first set of frequencies and a second set of frequencies in a similar manner to that illustrated by diagrams 510 and 520. In addition, diagram 530 illustrates that two additional transmit antennas, denoted as Tx Antenna 3 and Tx Antenna 4, can transmit on alternating sets of frequency subcarriers at the beginning of each 0.5 ms slot such that all 4 transmit antennas transmit pilot tones on adjacent frequency subcarriers at the beginning of each slot.

In accordance with one aspect, transmit power utilized by respective antennas at a cell can also be adjusted to improve reference signal detection performance at a UE. By way of specific, non-limiting example, for the case of a cell employing 4 transmit antennas as illustrated by diagram 530 in FIG. 5C, a variety of power usage strategies can be employed to improve pilot detection performance. For example, available transmit power for a sector can be uniformly distributed across all transmit antennas at the sector to facilitate uniform detection of pilot signals from all antennas simultaneously. Alternatively, the available power can be cycled through the transmit antennas such that the power of one of the four transmit antennas is increased one-fourth of the time, thereby facilitating the individual detection of pilot signals from respective antennas. In such an example, the length in time of a reference signal transmission can be appropriately extended to allow detection of all pilot symbols in the reference signal. As another example, an overall transmit power utilized at a cell during subframes for which a synchronization code and/or reference signal is transmitted can be adjusted. For example, transmissions from antennas at a given cell can be disabled for a subframe in which a synchronization code and/or reference signal is transmitted. Additionally and/or alternatively, pilot tones transmitted on subframes in which a synchronization code is transmitted can be boosted in power to improve the reliability of reference signal detection at a UE. When such a power boosting scheme is utilized, identities of tones for which power is boosted can be signaled to the UE to allow the UE to discount the power boost when performing channel quality measurements to ensure the accuracy of said measurements.

Figure 6:
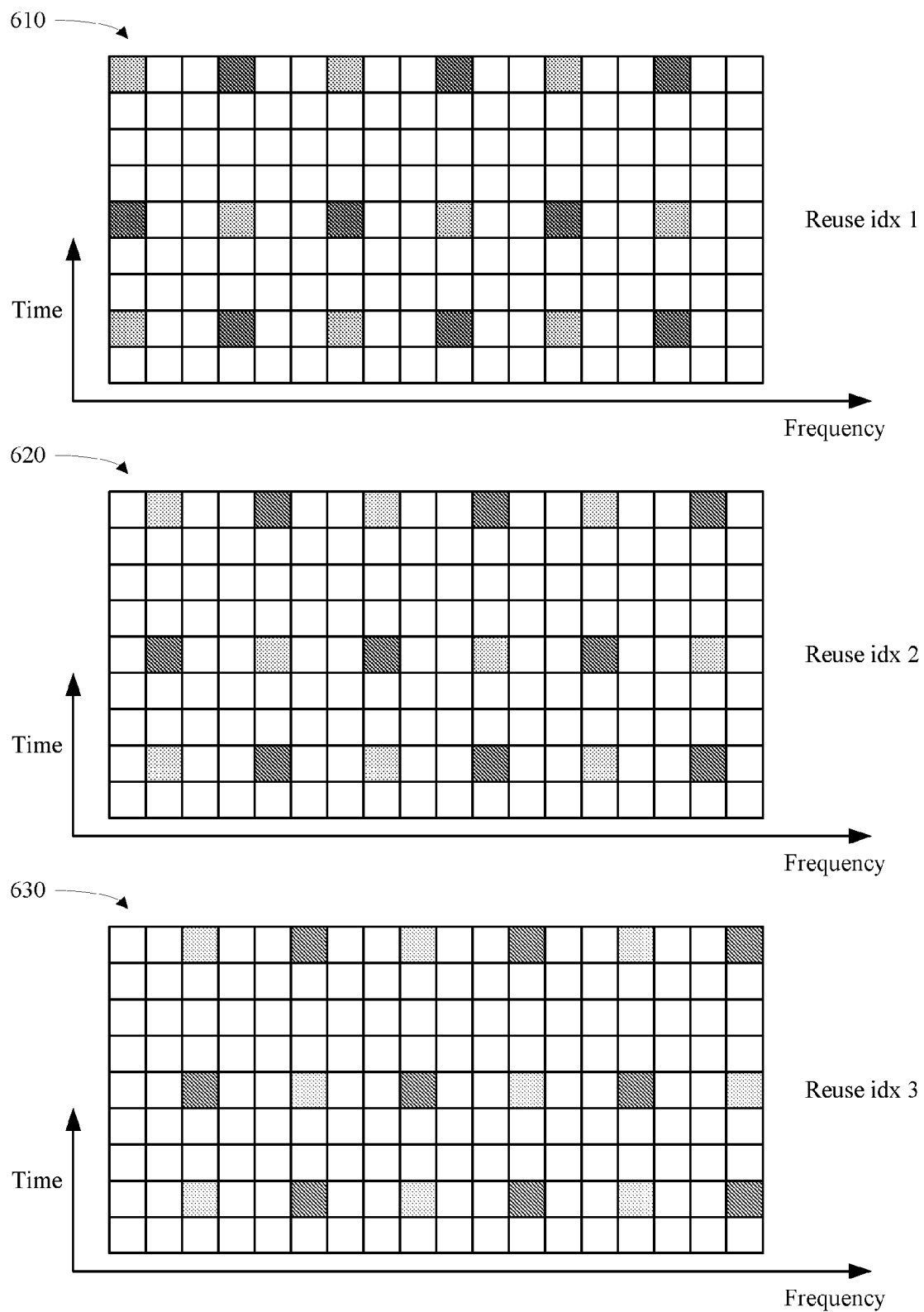
FIG. 6 illustrates frequency reuse patterns that can be utilized for the transmission of a reference signal in accordance with various aspects.

FIG. 6 is a series of diagrams 610-630 that illustrate frequency reuse patterns that can be utilized for transmission of reference signals in accordance with various aspects. In a similar manner to diagrams 510-530, darkened areas in diagrams 610-630 correspond to locations in frequency and time at which pilot tones can be transmitted while white areas correspond to locations in frequency and time at which data can be transmitted. Transmissions illustrated by diagrams 610-630 can be, for example, conducted by sectors (e.g., sectors 104) employing two transmit antennas per sector in a similar manner to the transmission illustrated by diagram 520. Further, by way of specific example, reference signals illustrated by diagrams 610-630 can be used in connection with an extended cyclic prefix (CP). In such an example, reference signals transmitted by respective sectors can be based on PN and/or other sequences that are unique to the sectors.

In accordance with one aspect, reference signals transmitted by one or more sectors can be constrained in frequency as illustrated by diagrams 610-630 to improve detection probability at a UE (e.g., a terminal 250). In one example, reference signals can be transmitted as illustrated by diagram 610 from multiple sectors. However, if the pilot tones from which the reference signals are constructed are transmitted on the same frequencies, pilot tones transmitted from nearby sectors can collide due to being received by the UE at the same time. As a result, the UE may experience errors in detecting pilot tones corresponding to a reference signal transmitted from a particular sector and may have to try multiple hypotheses corresponding to a cell ID of a sector from which a given reference signal is received. Thus, to mitigate the effects of pilot tones transmitted from multiple sectors colliding at a UE and to account for cell ID hypothesis at a UE, a frequency reuse pattern can be applied to reference signals transmitted from respective sectors in the system as illustrated by diagrams 610-630 to shift pilot tones transmitted by nearby sectors in frequency such that they do not collide with one another.

In one example, frequency shifts applied for reference signals transmitted from respective sectors can be linked to the cell IDs of the respective sectors. By way of example, a 3-frequency reuse pattern can be employed as illustrated by diagrams 610-630 to assign a frequency reuse index to a sector based on its cell ID. For example, a frequency shift can be assigned to a sector based on its cell ID modulo 3, such that a sector having a cell ID of 0, 3, 6, etc., can transmit reference signals at a base frequency pattern according to a first frequency reuse index as illustrated by diagram 610. Correspondingly, sectors having cell IDs of 1, 4, 7, etc., can transmit reference signals with a frequency shift of one position according to a second frequency reuse index as illustrated by diagram 620, and sectors having cell IDs of 2, 5, 8, etc., can transmit reference signals with a frequency shift of two positions according to a third frequency reuse index as illustrated by diagram 630. Alternatively, a frequency shift assigned to a sector can depend on the group ID of the cell group to which the sector is located rather than an identification of the particular sector. In one example, information regarding the frequency shift utilized by one or more sectors for reference signal transmission can be conveyed to a UE through a PSC, SSC, and/or another appropriate signal prior to detection of the reference signal(s).

In accordance with another aspect, the frequency shift patterns illustrated by diagrams 610-630 can be utilized as a basis for multiplexing reference signals from different sectors using frequency division multiplexing (FDM). Conventionally, a reference signal is multiplexed using code division multiplexing (CDM) by applying an orthogonal sequence corresponding to a sector to the pilot tones that constitute the reference signal transmitted by the sector. Reference signals of respective sectors in a cell are then transmitted simultaneously on the same time and frequency resources and multiplexed via the applied orthogonal sequences. However, because such a multiplexing scheme requires transmission to multiple sectors over the same resources, very little flexibility is provided for the transmit power of reference signals from particular sectors.

Thus, in one example, frequency shifts illustrated by diagrams 610-630 can be utilized to facilitate 3-sector FDM, wherein reference signals from different sectors can be multiplexed in frequency. Because multiplexing is done in frequency rather than through an orthogonal code, each reference signal is transmitted on separate frequency resources. As a result, greater transmit power flexibility is provided than what is available for transmission of reference signals using CDM, as available transmit power can be non-equally proportioned between the reference signals. Additionally, because reference signals are separated in frequency, different power boosting factors can be utilized for different reference signals based on, for example, channel conditions of a sector at which a particular reference signal is transmitted. Additionally and/or alternatively, discontinuous transmission (DTX) can be utilized to transmit data between tones reserved for transmission of a reference signal as illustrated by diagrams 610-630.

In another example, the techniques for 3-sector FDM as described above can be extended to a cell having additional sectors by combining FDM with CDM. As a specific example, FDM and CDM can be used in combination for the transmission of reference signals by a cell having 9 sectors by dividing the cell into 3 groups of 3 sectors. The groups can be defined, for example, using FDM based on a 3-frequency reuse pattern as described above. Within each group, CDM can then be utilized to identify reference signals transmitted from individual sectors.

Figure 7:
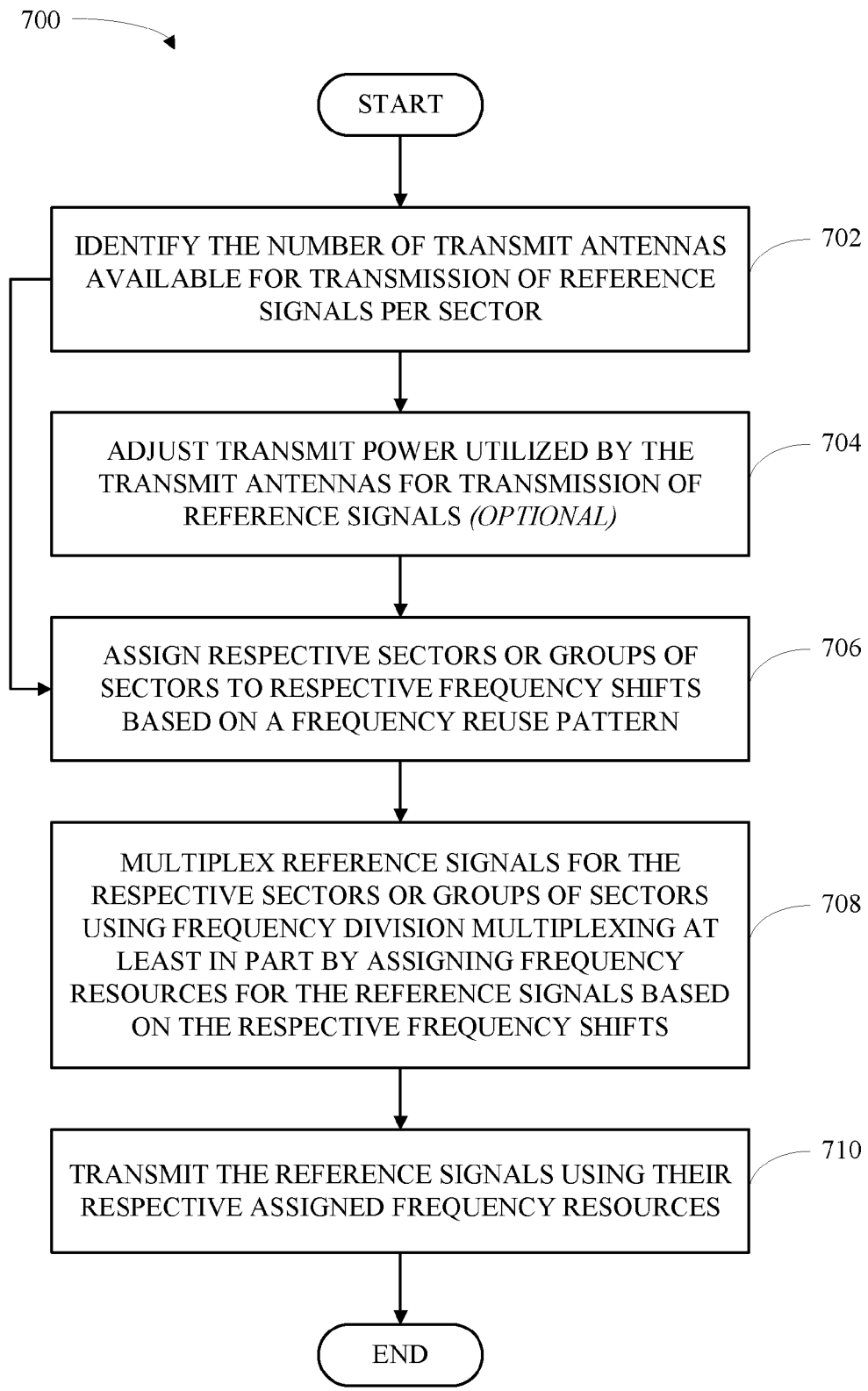
FIG. 7 is a flow diagram of a methodology for transmitting reference signals and provisioning resources for use with transmitting said signals.
Figure 8:
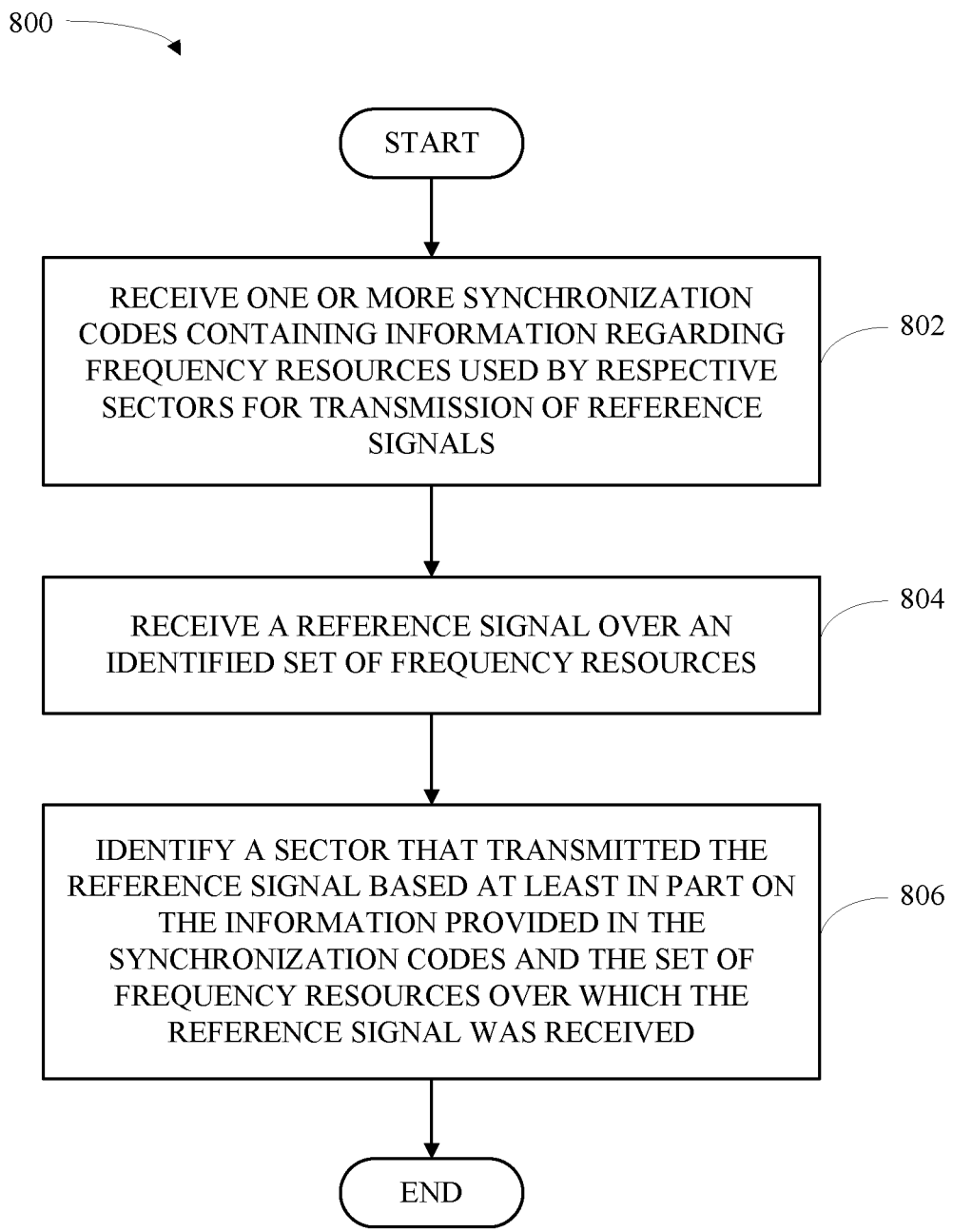
FIG. 8 is a flow diagram of a methodology for identifying a source of a reference signal based on properties of the reference signal.
Figure 9:
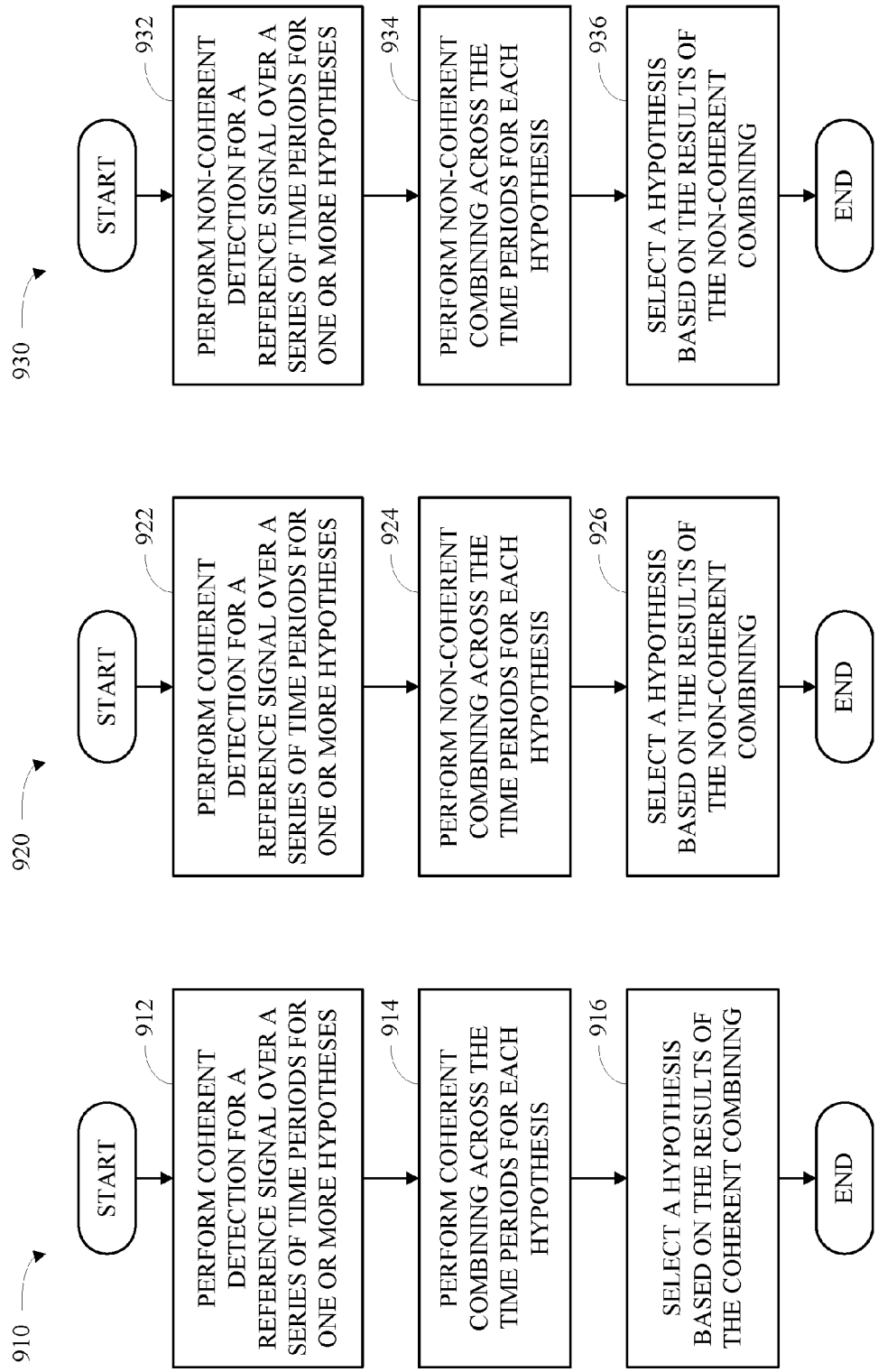
FIGS. 9A-9C are flow diagrams of methodologies for reference signal detection and processing.

Referring to FIGS. 7-9, methodologies for cell search in a wireless communication system are illustrated. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

FIG. 7 illustrates a methodology 700 for transmitting reference signals (e.g., reference signals 236) and provisioning resources for use with transmitting said signals. It is to be appreciated that methodology 700 can be performed by, for example, a base station (e.g., a base station 210 in system 200) and/or any other appropriate network entity. Methodology 700 begins at block 702, wherein the number of transmit antennas available per sector for transmission of reference signals is identified. In one example, the number of transmit antennas per sector can be determined at block 702 to determine a pilot tone structure to be utilized for a reference signal. For example, as described supra, a sector having one transmit antenna can transmit a reference signal based on diagram 510 in FIG. 5A, a sector having two transmit antennas can transmit a reference signal based on diagram 520 in FIG. 5B, and a sector having four transmit antennas can transmit a reference signal based on diagram 530 in FIG. 5C.

Methodology 700 can then optionally proceed to block 704, wherein a transmit power utilized by the transmit antennas identified at block 702 at respective sectors (e.g., sectors 104 served by an entity performing methodology 700) for transmission of respective reference signals (e.g., reference signals 236) is adjusted. Power boosting at 704 can be performed, for example, to improve reference signal detection performance at a UE (e.g., a terminal 250). In one example, a transmit power assigned to a given antenna identified at block 702 for reference signal transmission can be individually increased or decreased in relation to a transmit power for data and/or transmissions. Further, adjustments made at block 704 can be constant or cycling.

Upon completing the acts described at blocks 702 and/or 704, methodology 700 can proceed to block 706, wherein respective sectors or groups of sectors are assigned to respective frequency shifts based on a frequency reuse pattern. In one example, frequency shifts assigned at block 706 can be applied to pilot tones that constitute reference signals from the respective sectors as illustrated and described by diagrams 610-630 and the related discussion supra. Additionally, frequency shifts applied at block 706 can be applied to individual sectors or groups of sectors.

Next, at block 708, reference signals from the respective sectors or groups of sectors for which frequency shifts were applied at block 706 are multiplexed using FDM at least in part by assigning frequency resources for the reference signals based on the frequency shifts applied at block 706. In one example, reference signals from respective sectors are constructed based on the frequency shifts applied at block 706. Accordingly, these frequency shifts can be utilized as a basis for multiplexing the reference signals using FDM as described in relation to FIG. 6 supra. In another example, if frequency shifting at block 706 is performed for groups of sectors, multiplexing at block 708 can be performed by combining FDM with CDM. For example, sector groups can be multiplexed at block 708 using FDM, and reference signals from sectors within the sector groups can in turn be multiplexed using CDM. Upon completing the act described at block 708, methodology 700 can then conclude at block 710, wherein the reference signals are transmitted using their respective assigned frequency resources.

FIG. 8 illustrates a methodology 800 for identifying a source of a reference signal based on properties of the reference signal. Methodology 800 can be performed by, for example, a terminal (e.g., a terminal 250) and/or any other suitable entity in a wireless communication system. Methodology 800 begins at block 802, wherein one or more synchronization codes are received that contain information regarding frequency resources used by respective sectors for transmission of reference signals. Information received at block 802 can be conveyed using, for example, a primary synchronization code (e.g., PSC 232), a secondary synchronization code (e.g., SSC 234), and/or another appropriate signal. Further, the synchronization codes received at block 800 can convey time information based on their time location within a radio frame, a sequence(s) used for their construction, and/or other factors. In one example, the information received at block 802 can include frequency shifts used for transmission of reference signals from various sectors served by a NodeB (e.g., a base station 210), which can be based on cell IDs of respective sectors or group IDs of respective groups of sectors. In another example, synchronization codes received at block 802 can also contain info regarding the number of sectors served by each NodeB in the system and/or the number of transmit antennas employed per cell in order to improve reference signal detection performance at an entity performing methodology 800.

Methodology 800 then proceeds to block 804, wherein a reference signal is received over an identified set of frequency resources. In one example, an entity performing methodology 800 can attempt to detect a reference signal at block 804 on multiple sets of frequencies corresponding to respective frequency shifts provided at block 802. Once a reference signal is received, frequency resources over which the reference signal was received can then be identified and methodology 800 can conclude at block 806, wherein a sector that transmitted the reference signal received at block 804 is identified based at least in part on the frequency shift information provided by the synchronization codes at block 802 and the frequency resources over which the reference signal was received at block 804. In one example, frequency shift information provided at block 802 can link specific shifts in frequency to cell IDs of single sectors. In such an example, a sector from which a reference signal is received at block 804 can be identified at block 806 from the frequencies at which the reference signal was received alone. Alternatively, frequency shift information provided at block 802 can be linked to cell group IDs and a cell group containing the sector that transmitted the reference signal received at block 804 can be identified from the frequency shift used for transmission of the reference signal. In such an example, additional multiplexing using a technique such as CDM can then be utilized to facilitate identification of a particular sector within the cell group from which the reference signal was received.

FIGS. 9A-9C illustrate various methodologies 910-930 for reference signal detection and processing in a wireless communication system. Methodologies 910-930 can be performed by, for example, a terminal and/or any other suitable entity in a wireless communication system. In accordance with one aspect, a reference signal can be composed of a series of OFDM symbols transmitted over corresponding time periods (e.g., 0.5 ms). Further, at the time a reference signal is transmitted, a terminal may not know one or more parameters regarding how the reference signal was transmitted. For example, the terminal may not know the number of transmit antennas used to transmit a given reference signal, which can affect the structure of the reference signal as described with regard to FIGS. 5A-5C supra. As a result, the terminal can attempt to detect a reference signal as illustrated by one or more of FIGS. 9A-9C under a set of hypotheses that can respectively correspond to numbers of transmit antennas in order to determine a number of transmit antennas that transmitted the reference signal.

FIGS. 9A-9C illustrate various methodologies 910-930 that can be utilized by a terminal for detecting a reference signal. As generally illustrated by FIGS. 9A-9C, a reference signal can be detected by performing detection for a single OFDM symbol or time period under a series of hypotheses and then combining these partial results for the series of hypotheses to determine an appropriate hypothesis. Turning specifically to FIG. 9A, a flow diagram of a first methodology 910 for detecting and processing a reference signal is illustrated. Methodology 910 begins at block 912, wherein coherent detection is performed for a reference signal over a series of time periods for one or more hypotheses. In one example, coherent detection utilizes a fixed channel reference obtained from another channel (e.g., a channel on which a PSC 232 and/or SSC 234 is transmitted) to locate pilot tones that constitute a reference signal in frequency. These tones can then be summed for each time period and hypothesis to be considered at block 912. Next, at block 914, coherent combining is performed across the time periods for each hypothesis considered at block 912. More specifically, coherent combining can be performed at block 914 by performing a direct summation for each hypothesis of the coherently detected partial results obtained at block 912 for the series of time periods. Upon completing the combining at block 914, methodology 910 can conclude at block 916, wherein a hypothesis is selected based on the results of the combining.

FIG. 9B illustrates a second methodology 920 for detecting and processing a reference signal. Methodology 920 begins at block 922, wherein coherent detection is performed for a reference signal over a series of time periods for one or more hypotheses in a similar manner to block 912 of methodology 910. Next, at block 924, non-coherent combining is performed across the time periods for each hypothesis considered at block 922. In one example, coherently detected partial results obtained at block 922 can be non-coherently combined at block 924 by first obtaining the energy of each partial result and then summing the total energy over the time periods for each hypothesis to be considered. Methodology 920 can then conclude at block 926 by selecting a hypothesis based on the results of the combining performed at block 924.

FIG. 9C illustrates a third methodology 930 for detecting and processing a reference signal. Methodology 930 begins at block 932, wherein non-coherent detection is performed for a reference signal over a series of time periods for one or more hypotheses. In contrast to the coherent detection performed at blocks 912 and 922, non-coherent detection does not utilize a channel reference. Instead, a reference signal can be directly summed in the frequency domain for each time period and hypothesis to be considered at block 932. Next, at block 934, non-coherent combining is performed across the time periods for each hypothesis considered at block 932. In one example, non-coherent combining at block 934 can be performed by performing a direct summation of the partial results obtained at block 932 over the time periods for each hypothesis to be considered. Finally, at block 936, a hypothesis can be selected based on the results of the combining performed at block 934.

Figure 10:
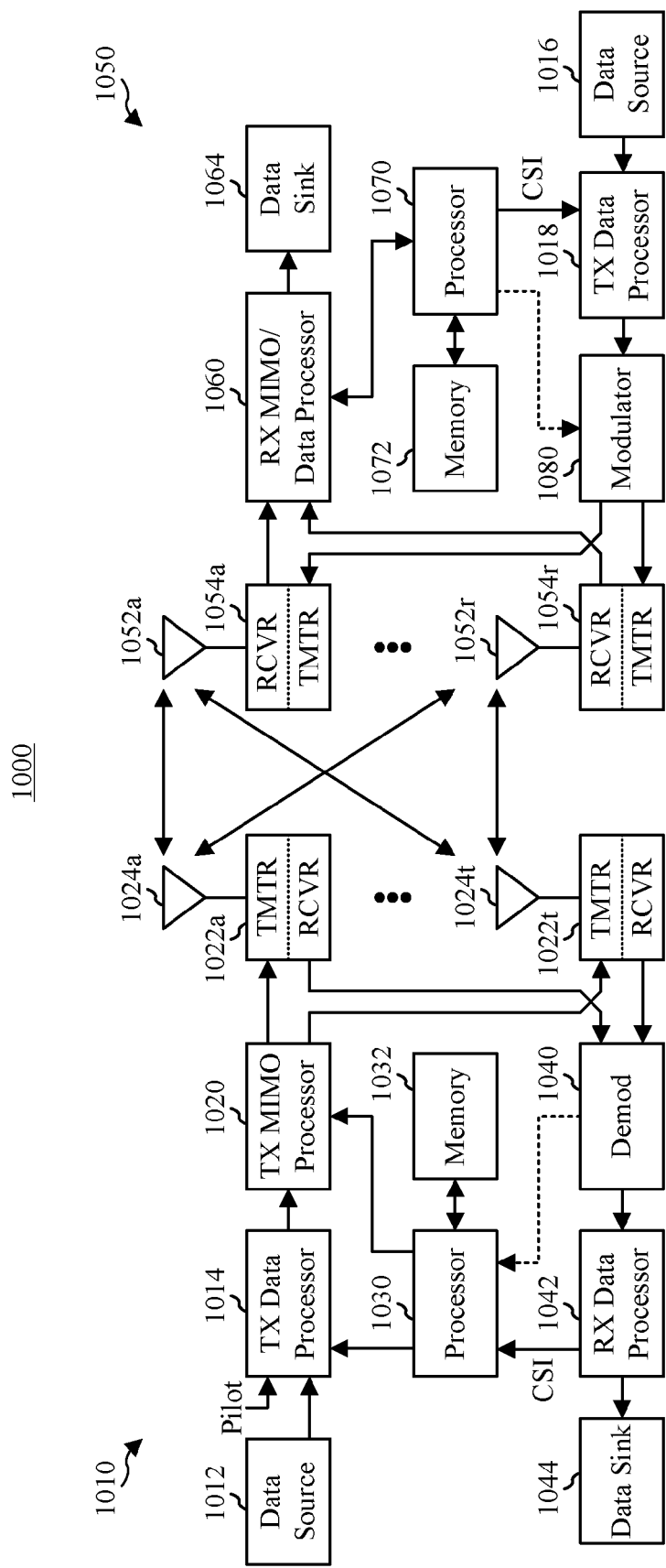
FIG. 10 is a block diagram illustrating an example wireless communication system in which various aspects described herein may function.

Referring now to FIG. 10, a block diagram illustrating an example wireless communication system 1000 in which one or more embodiments described herein can function is provided. In one example, system 1000 is a multiple-input multiple-output (MIMO) system that includes a transmitter system 1010 and a receiver system 1050. It should be appreciated, however, that transmitter system 1010 and/or receiver system 1050 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1010 and/or receiver system 1050 described herein could be utilized in connection with a single output to single input antenna system.

In accordance with one aspect, traffic data for a number of data streams are provided at transmitter system 1010 from a data source 1012 to a transmit (TX) data processor 1014. In one example, each data stream can then be transmitted via a respective transmit antenna 1024. Additionally, TX data processor 1014 can format, code, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1050 to estimate channel response. Back at transmitter system 1010, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1030.

Next, modulation symbols for all data streams can be provided to a TX processor 1020, which can further process the modulation symbols (e.g., for OFDM). TX MIMO processor 1020 can then provides $N_T$ modulation symbol streams to $N_T$ transceivers 1022a through 1022t. In one example, each transceiver 1022 can receive and process a respective symbol stream to provide one or more analog signals. Each transceiver 1022 can then further condition (e.g., amplify, filter, and upconvert) the analog signals to provide a modulated signal suitable for transmission over a MIMO channel. Accordingly, $N_T$ modulated signals from transceivers 1022a through 1022t can then be transmitted from $N_T$ antennas 1024a through 1024t, respectively.

In accordance with another aspect, the transmitted modulated signals can be received at receiver system 1050 by $N_R$ antennas 1052a through 1052r. The received signal from each antenna 1052 can then be provided to respective transceivers 1054. In one example, each transceiver 1054 can condition (e.g., filter, amplify, and downconvert) a respective received signal, digitize the conditioned signal to provide samples, and then processes the samples to provide a corresponding "received" symbol stream. An RX MIMO/data processor 1060 can then receive and process the $N_R$ received symbol streams from $N_R$ transceivers 1054 based on a particular receiver processing technique to provide $N_T$ "detected" symbol streams. In one example, each detected symbol stream can include symbols that are estimates of the modulation symbols transmitted for the corresponding data stream. RX processor 1060 can then process each symbol stream at least in part by demodulating, deinterleaving, and decoding each detected symbol stream to recover traffic data for a corresponding data stream. Thus, the processing by RX processor 1060 can be complementary to that performed by TX MIMO processor 1020 and TX data processor 1014 at transmitter system 1010. RX processor 1060 can additionally provide processed symbol streams to a data sink 1064.

In accordance with one aspect, the channel response estimate generated by RX processor 1060 can be used to perform space/time processing at the receiver, adjust power levels, change modulation rates or schemes, and/or other appropriate actions. Additionally, RX processor 1060 can further estimate channel characteristics such as, for example, signal-to-noise-and-interference ratios (SNRs) of the detected symbol streams. RX processor 1060 can then provide estimated channel characteristics to a processor 1070. In one example, RX processor 1060 and/or processor 1070 can further derive an estimate of the "operating" SNR for the system. Processor 1070 can then provide channel state information (CSI), which can comprise information regarding the communication link and/or the received data stream. This information can include, for example, the operating SNR. The CSI can then be processed by a TX data processor 1018, modulated by a modulator 1080, conditioned by transceivers 1054a through 1054r, and transmitted back to transmitter system 1010. In addition, a data source 1016 at receiver system 1050 can provide additional data to be processed by TX data processor 1018.

Back at transmitter system 1010, the modulated signals from receiver system 1050 can then be received by antennas 1024, conditioned by transceivers 1022, demodulated by a demodulator 1040, and processed by a RX data processor 1042 to recover the CSI reported by receiver system 1050. In one example, the reported CSI can then be provided to processor 1030 and used to determine data rates as well as coding and modulation schemes to be used for one or more data streams. The determined coding and modulation schemes can then be provided to transceivers 1022 for quantization and/or use in later transmissions to receiver system 1050. Additionally and/or alternatively, the reported CSI can be used by processor 1030 to generate various controls for TX data processor 1014 and TX MIMO processor 1020. In another example, CSI and/or other information processed by RX data processor 1042 can be provided to a data sink 1044.

In one example, processor 1030 at transmitter system 1010 and processor 1070 at receiver system 1050 direct operation at their respective systems. Additionally, memory 1032 at transmitter system 1010 and memory 1072 at receiver system 1050 can provide storage for program codes and data used by processors 1030 and 1070, respectively. Further, at receiver system 1050, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

Figure 11:
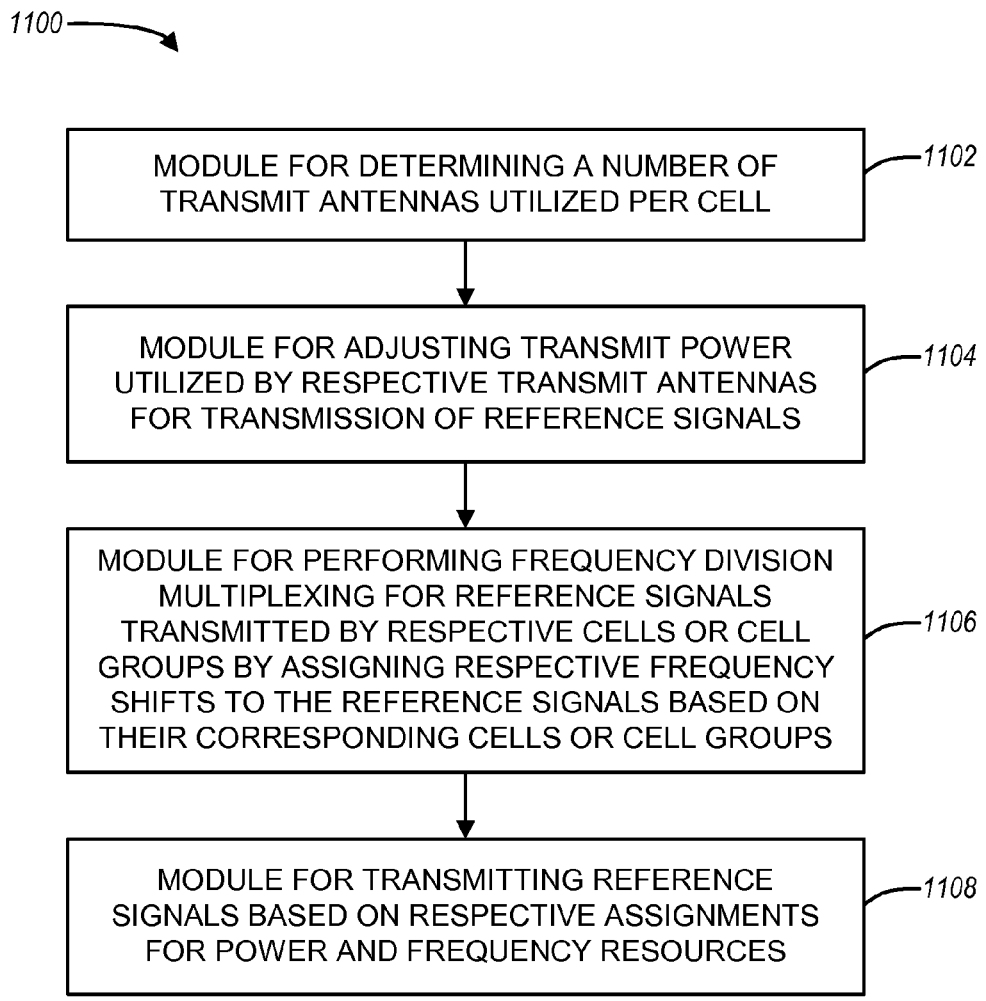
FIG. 11 is a block diagram of an apparatus that coordinates transmission of reference signals and resources used in connection therewith.

FIG. 11 illustrates an apparatus 1100 that coordinates transmission of reference signals (e.g., reference signals 236) and resources used in connection therewith. It is to be appreciated that apparatus 1100 is illustrated as including functional blocks, which can be functional blocks that represent functions implemented by a processor, software, or a combination thereof (e.g., firmware). Apparatus 1100 can be implemented in a Node B (e.g., a base station 210) and/or another suitable network entity and can include a module 1102 for determining a number of transmit antennas utilized per cell (e.g., per sector 104), a module 1104 for adjusting transmit power utilized by respective transmit antennas for transmission of reference signals, a module 1106 for performing frequency division multiplexing for reference signals transmitted by respective cells or cell groups by assigning respective frequency shifts to the respective signals based on their corresponding cells or cell groups, and a module 1108 for transmitting reference signals based on respective assignments for power and frequency resources.

Figure 12:
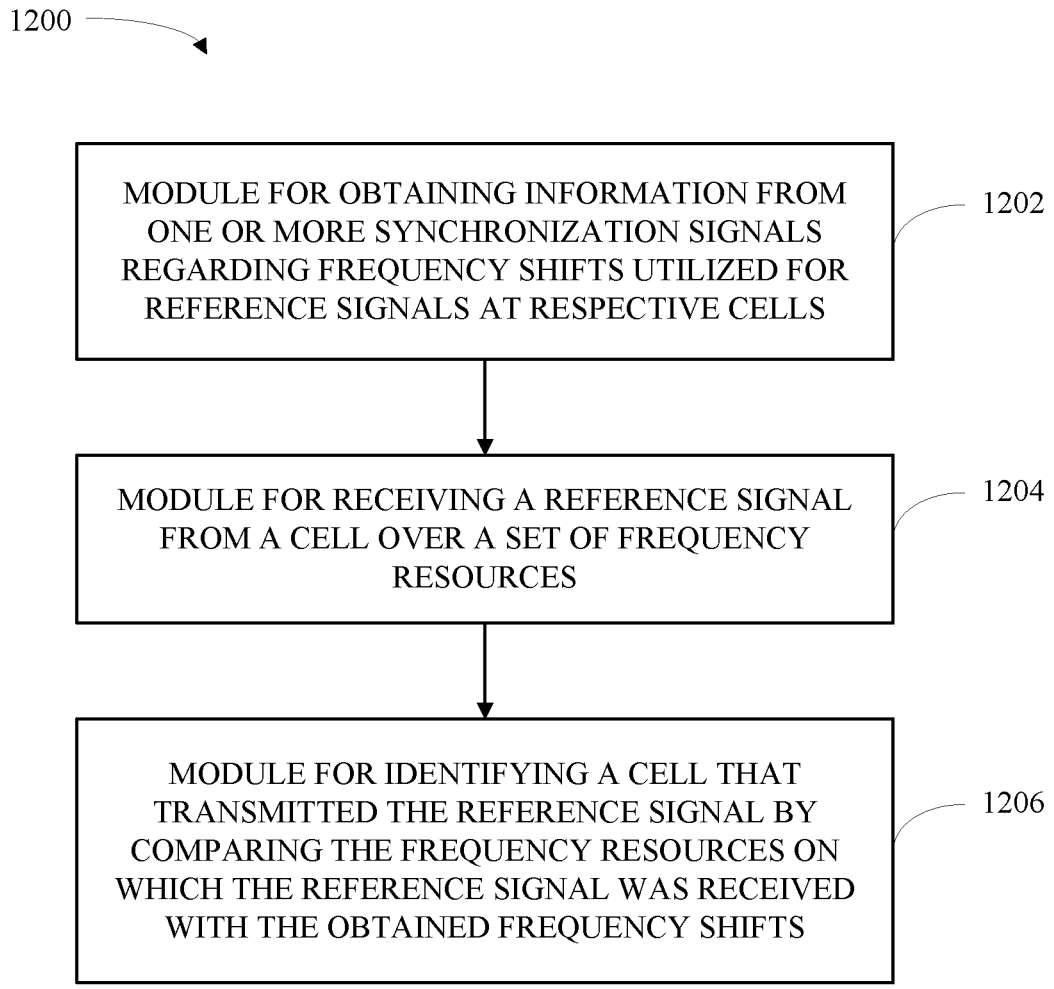
FIG. 12 is a block diagram of an apparatus that facilitates identification of a cell from which a reference signal is received.

FIG. 12 illustrates an apparatus 1200 that facilitates identification of a cell (e.g., a sector 104 in system 100) from which a reference signal is received. Apparatus 1200 can be implemented in a UE (e.g., a terminal 250) and/or another suitable network entity and can include a module 1202 for obtaining information from one or more synchronization signals regarding frequency shifts utilized for reference signals at respective cells, a module 1204 for receiving a reference signal from a cell over a set of frequency resources, and a module 1206 for identifying a cell that transmitted the reference signal by comparing the frequency resources on which the reference signal was received with the obtained frequency shifts.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method for wireless communication, comprising:
   determining, based on a cell identity (ID) of a cell, a set of subcarriers assigned to the cell from among a plurality of sets of subcarriers available for assignment to cells, wherein each of the plurality of sets of subcarriers comprises a plurality of subsets of subcarriers, and wherein each subset of subcarriers of the plurality of subsets of subcarriers assigned to the cell has a same frequency shift from corresponding subsets of subcarriers of other sets of the plurality of sets of subcarriers assigned to other cells;
   generating a reference signal for transmission on the set of subcarriers assigned to the cell, wherein the cell comprises at least one antenna, with each antenna utilizing one subset of subcarriers for the reference signal in each symbol period in which the reference signal is transmitted and utilizing at least two subsets of subcarriers among the plurality of subsets of subcarriers in at least two different symbol periods; and
   transmitting the reference signal by the cell on the set of subcarriers assigned to the cell.

2. The method of claim 1, further comprising:
   conducting discontinuous transmission of data by the cell on subcarriers used to transmit the reference signal.

3. The method of claim 1, wherein the determining comprises determining the set of subcarriers assigned to the cell based on a modulo operation on the cell identity (ID) of the cell in relation to a total number of frequency shifts for subsets of subcarriers of the plurality of sets of subcarriers.

4. The method of claim 1, further comprising:
   adjusting transmit power utilized for transmission of the reference signal by the cell.

5. The method of claim 1, further comprising:
   identifying a plurality of transmit antennas at the cell to use for transmitting the reference signal; and
   uniformly distributing transmit power utilized for transmission of the reference signal at the cell among the plurality of transmit antennas.

6. The method of claim 1, further comprising:
   identifying a plurality of transmit antennas at the cell to use for transmitting the reference signal; and
   cycling transmit power utilized for transmission of the reference signal at the cell among the plurality of transmit antennas as a function of time.

7. The method of claim 1, further comprising:
   applying an offset to transmit power utilized for transmission of the reference signal at the cell such that a power level utilized for reference signal transmission is higher than a power level used for data transmission at the cell.

8. The method of claim 1, further comprising transmitting one or more synchronization codes providing information regarding the set of subcarriers assigned to the cell.

9. The method of claim 8, wherein the one or more synchronization codes further provide channel information to facilitate coherent detection of the reference signal transmitted by the cell.

10. A wireless communications apparatus, comprising:
    a processor configured to:
      determine, based on a cell identity (ID) of a cell, a set of subcarriers assigned to a cell from among a plurality of sets of subcarriers available for assignment to cells, wherein each of the plurality of sets of subcarriers comprises a plurality of subsets of subcarriers, and wherein each subset of subcarriers of the plurality of subsets of subcarriers assigned to the cell has a same frequency shift from corresponding subsets of subcarriers of other sets of the plurality of sets of subcarriers assigned to other cells, generate a reference signal for transmission on the set of subcarriers assigned to the cell, and wherein the cell comprises at least one antenna, with each antenna utilizing one subset of subcarriers for the reference signal in each symbol period in which the reference signal is transmitted and utilizing at least two subsets of subcarriers among the plurality of subsets of subcarriers in at least two different symbol periods, and send the reference signal by the cell on the set of subcarriers assigned to the cell; and a memory that stores data for the processor.

11. The wireless communications apparatus of claim 10, wherein the memory further stores information relating to a number of available transmit antennas at the cell for transmission of the reference signal, and wherein the processor is further configured to adjust transmit power utilized for transmission of the reference signal by the cell.

12. The wireless communications apparatus of claim 10, wherein the processor is further configured to determine whether a plurality of transmit antennas are available for transmission of the reference signal by the cell and, upon a positive determination, to distribute transmit power utilized for transmission of the reference signal among the plurality of transmit antennas at the cell.

13. The wireless communications apparatus of claim 10, wherein the processor is further configured to apply an offset to transmit power utilized for transmission of the reference signal at the cell such that a power level utilized for reference signal transmission at the cell is higher than a power level used for data transmission at the cell.

14. The wireless communications apparatus of claim 13, wherein the processor is further configured to instruct transmission of information relating to the offset applied to the transmit power utilized for transmission of the reference signal at the cell.

15. The wireless communications apparatus of claim 10, wherein the processor is further configured to instruct transmission of one or more synchronization codes that provide information relating to the set of subcarriers assigned to the cell.

16. The wireless communications apparatus of claim 15, wherein the one or more synchronization codes further provide information relating to a number of cells served by the wireless communications apparatus.

17. An apparatus for wireless communication, comprising:
means for determining, based on a cell identity (ID) of a cell, a set of subcarriers assigned to a cell from among a plurality of sets of subcarriers available for assignment to cells, wherein each of the plurality of sets of subcarriers comprises a plurality of subsets of subcarriers, and wherein each subset of subcarriers of the plurality of subsets of subcarriers assigned to the cell has a same frequency shift from corresponding subsets of subcarriers of other sets of the plurality of sets of subcarriers assigned to other cells;

means for generating a reference signal for transmission on the set of subcarriers assigned to the cell, and wherein the cell comprises at least one antenna, with each antenna utilizing one subset of subcarriers for the reference signal in each symbol period in which the reference signal is transmitted and utilizing at least two subsets of subcarriers among the plurality of subsets of subcarriers in at least two different symbol periods; and means for transmitting the reference signal by the cell on the set of subcarriers assigned to the cell.

18. A non-transitory computer-readable medium, comprising:
code for causing a computer to determine, based on a cell identity (ID) of a cell, a set of subcarriers assigned to a cell from among a plurality of sets of subcarriers available for assignment to cells, wherein each of the plurality of sets of subcarriers comprises a plurality of subsets of subcarriers, and wherein each subset of subcarriers of the plurality of subsets of subcarriers assigned to the cell has a same frequency shift from corresponding subsets of subcarriers of other sets of the plurality of sets of subcarriers assigned to other cells;

code for causing the computer to generate a reference signal for transmission on the set of subcarriers assigned to the cell, and wherein the cell comprises at least one antenna, with each antenna utilizing one subset of subcarriers for the reference signal in each symbol period in which the reference signal is transmitted and utilizing at least two subsets of subcarriers among the plurality of subsets of subcarriers in at least two different symbol periods; and code for causing the computer to send the reference signal by the cell on the set of subcarriers assigned to the cell.

19. An integrated circuit for wireless communication, the integrated circuit executing computer-executable instructions comprising:
determining, based on a cell identity (ID) of a cell, a set of subcarriers assigned to a cell from among a plurality of sets of subcarriers available for assignment to cells, wherein each of the plurality of sets of subcarriers comprises a plurality of subsets of subcarriers, and wherein each subset of subcarriers of the plurality of subsets of subcarriers assigned to the cell has a same frequency shift from corresponding subsets of subcarriers of other sets of the plurality of sets of subcarriers assigned to other cells;

generating a reference signal for transmission on the set of subcarriers assigned to the cell, and wherein the cell comprises at least one antenna, with each antenna utilizing one subset of subcarriers for the reference signal in each symbol period in which the reference signal is transmitted and utilizing at least two subsets of subcarriers among the plurality of subsets of subcarriers in at least two different symbol periods; and sending the reference signal by the cell on the set of subcarriers assigned to the cell.

20. A method for wireless communication, comprising:
receiving a reference signal from a cell; and
obtaining, based on a cell identity (ID) of the cell, the reference signal from a set of subcarriers assigned to the cell for transmission of the reference signal, wherein the set of subcarriers assigned to the cell is one of a plurality of sets of subcarriers available for assignment to cells, wherein each of the plurality of sets of subcarriers comprises a plurality of subsets of subcarriers, wherein each subset of subcarriers of the plurality of subsets of subcarriers assigned to the cell has a same frequency shift from corresponding subsets of subcarriers of other sets of the plurality of sets of subcarriers assigned to other cells, and wherein the cell comprises at least one antenna, with each antenna utilizing one subset of subcarriers for the reference signal in each symbol period in which the reference signal is transmitted and utilizing at least two subsets of subcarriers among the plurality of subsets of subcarriers in at least two different symbol periods.

21. The method of claim 20, further comprising:
receiving one or more synchronization codes from the cell; and
obtaining information relating to the set of subcarriers assigned to the cell based on the one or more synchronization codes.

22. The method of claim 20, further comprising:
determining a power boost applied to transmission of the reference signal by the cell in relation to data transmission from the cell.

23. The method of claim 22, further comprising computing one or more channel quality indicators at least in part by discounting the power boost applied to the reference signal from one or more power measurements used to compute the one or more channel quality indicators.

24. The method of claim 20, wherein the receiving a reference signal comprises determining a number of transmit antennas at the cell used for transmission of the reference signal at least in part by detecting the reference signal under one or more hypotheses corresponding to different transmit antenna configurations.

25. The method of claim 20, further comprising:
performing coherent detection for the reference signal over a series of time periods; and
coherently combining partial results obtained from the coherent detection.

26. The method of claim 20, further comprising:
performing coherent detection for the reference signal over a series of time periods; and
non-coherently combining partial results obtained from the coherent detection.

27. The method of claim 20, further comprising:
performing non-coherent detection for the reference signal over a series of time periods; and
non-coherently combining partial results obtained from the non-coherent detection.

28. The method of claim 20, further comprising:
receiving a second reference signal from a second cell; and
obtaining the second reference signal from a second set of subcarriers assigned to the second cell for transmission of the second reference signal, wherein the second set of subcarriers assigned to the second cell is one of the plurality of sets of subcarriers available for assignment to cells, and wherein each subset of subcarriers of the plurality of subsets of subcarriers assigned to the second cell has a first frequency shift from corresponding subsets of subcarriers of the set of subcarriers assigned to the cell.

29. The method of claim 28, wherein each subset of subcarriers of the second set of subcarriers assigned to the second cell is shifted by one subcarrier or two subcarriers from each corresponding subset of subcarriers assigned to the cell.

30. A wireless communications apparatus, comprising:
a processor configured to:
receive a reference signal from a cell, and obtain, based on a cell identity (ID) of the cell, the reference signal from a set of subcarriers assigned to the cell for transmission of the reference signal, wherein the set of subcarriers assigned to the cell is one of a plurality of sets of subcarriers available for assignment to cells, wherein each of the plurality of sets of subcarriers comprises a plurality of subsets of subcarriers, wherein each subset of subcarriers of the plurality of subsets of subcarriers assigned to the cell has a same frequency shift from corresponding subsets of subcarriers of other sets of the plurality of sets of subcarriers assigned to other cells, and wherein the cell comprises at least one antenna, with each antenna utilizing one subset of subcarriers for the reference signal in each symbol period in which the reference signal is transmitted and utilizing at least two subsets of subcarriers among the plurality of subsets of subcarriers in at least two different symbol periods; and
a memory that stores data for the processor.

31. The wireless communications apparatus 30, wherein the processor is further configured to receive one or more synchronization from the cell and to obtain information relating to the set of subcarriers assigned to the on the one or more synchronization codes.

32. The wireless communications apparatus of claim 30, wherein the memory further stores information relating to a power offset that is applied to transmission of the reference signal in relation to data transmission from the cell.

33. The wireless communications apparatus of claim 32, wherein the processor is further configured to compute one or more channel quality indicators at least in part by identifying a power level at which the reference signal is received and discounting the power offset from the identified power level.

34. The wireless communications apparatus of claim 30, wherein the processor is further configured to determine a number of transmit antennas at the cell used for transmission of the reference signal by testing one or more hypotheses corresponding to different transmit antenna configurations.

35. The wireless communications apparatus of claim 30, wherein the processor is further configured to perform coherent detection for the reference signal over a series of time periods, and to coherently combine partial results obtained from the coherent detection.

36. The wireless communications apparatus of claim 30, wherein the processor is further configured to perform coherent detection for the reference signal over a series of time periods, and to non-coherently combine partial results obtained from the coherent detection.

37. The wireless communications apparatus of claim 30, wherein the processor is further configured to perform non-coherent detection for the reference signal over a series of time periods, and to non-coherently combine partial results obtained from the coherent detection.

38. The wireless communications apparatus of claim 30, wherein the processor is further configured to:
receive a second reference signal from a second cell, and obtain the second reference signal from a second set of subcarriers assigned to the second cell for transmission of the second reference signal, wherein the second set of subcarriers assigned to the second cell is one of the plurality of sets of subcarriers available for assignment to cells, and wherein each subset of subcarriers of the plurality of subsets of subcarriers assigned to the second cell has a first frequency shift from corresponding subsets of subcarrires of the set of subcarriers assigned to the cell.

39. The wireless communications apparatus of claim 38, wherein each subset of subcarriers of the second set of subcarriers assigned to the second cell is shifted by one subcarrier or two subcarriers from each corresponding subset of subcarriers assigned to the cell.

40. An apparatus for wireless communication, comprising:
means for receiving a reference signal from a cell; and
means for obtaining, based on a cell identity (ID) of the cell, the reference signal from a set of subcarriers assigned to the cell for transmission of the reference signal, wherein the set of subcarriers assigned to the cell is one of a plurality of sets of subcarriers available for assignment to cells, wherein each of the plurality of sets of subcarriers comprises a plurality of subsets of subcarriers, wherein each subset of subcarriers of the plurality of subsets of subcarriers assigned to the cell has a same frequency shift from corresponding subsets of subcarriers of other sets of the plurality of sets of subcarriers assigned to other cells, and wherein the cell comprises at least one antenna, with each antenna utilizing one subset of subcarriers for the reference signal in each symbol period in which the reference signal is transmitted and utilizing at least two subsets of subcarriers among the plurality of subsets of subcarriers in at least two different symbol periods.

41. A non-transitory computer-readable medium, comprising:
  code for causing a computer to receive a reference signal from a cell; and
  code for causing the computer to obtain, based on a cell identity (ID) of the cell, the reference signal from a set of subcarriers assigned to the cell for transmission of the reference signal, wherein the set of subcarriers assigned to the cell is one of a plurality of sets of subcarriers available for assignment to cells, wherein each of the plurality of sets of subcarriers comprises a plurality of subsets of subcarriers, wherein each subset of subcarriers of the plurality of subsets of subcarriers assigned to the cell has a same frequency shift from corresponding subsets of subcarriers of other sets of the plurality of sets of subcarriers assigned to other cells, and wherein the cell comprises at least one antenna, with each antenna utilizing one subset of subcarriers for the reference signal in each symbol period in which the reference signal is transmitted and utilizing at least two subsets of subcarriers among the plurality of subsets of subcarriers in at least two different symbol periods.

42. An integrated circuit for wireless communication, the integrated circuit executing computer-executable instructions comprising:
  receiving a reference signal from a cell; and
  obtaining, based on a cell identity (ID) of the cell, the reference signal from a set of subcarriers assigned to the cell for transmission of the reference signal, wherein the set of subcarriers assigned to the cell is one of a plurality of sets of subcarriers available for assignment to cells, wherein each of the plurality of sets of subcarriers comprises a plurality of subsets of subcarriers, wherein each subset of subcarriers of the plurality of subsets of subcarriers assigned to the cell has a same frequency shift from corresponding subsets of subcarriers of other sets of the plurality of sets of subcarriers assigned to other cells, and wherein the cell comprises at least one antenna, with each antenna utilizing one subset of subcarriers for the reference signal in each symbol period in which the reference signal is transmitted and utilizing at least two subsets of subcarriers among the plurality of subsets of subcarriers in at least two different symbol periods.

* * * * *